US012591751B2

(12) United States Patent
    AlShikh

(10) Patent No.: US 12,591,751 B2
(45) Date of Patent: ***Mar. 31, 2026

(54) NATURAL LANGUAGE GENERATION USING KNOWLEDGE GRAPH INCORPORATING TEXTUAL SUMMARIES

(71) Applicant: Writer, Inc., San Francisco, CA (US)

(72) Inventor: Waseem AlShikh, Boca Raton, FL (US)

(73) Assignee: Writer, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/080,472

(22) Filed: Mar. 14, 2025

(65) Prior Publication Data

US 2025/0371048 A1      Dec. 4, 2025

Related U.S. Application Data

(60) Provisional application No. 63/654,558, filed on May 31, 2024.

(51) Int. Cl.
    *G06F 16/00* (2019.01)
    *G06F 16/3329* (2025.01)
        (Continued)

(52) U.S. Cl.
    CPC ........ *G06F 40/40* (2020.01); *G06F 16/33295* (2025.01); *G06F 16/345* (2019.01); *G06F 40/30* (2020.01); *G06N 5/04* (2013.01)

(58) Field of Classification Search
    CPC .......................... G06F 16/33295; G06F 16/345
        (Continued)

(56) References Cited

U.S. PATENT DOCUMENTS 5,857,198 A    1/1999  Schmidt
9,940,367 B1   4/2018  Baker et al.
        (Continued)

FOREIGN PATENT DOCUMENTS

KR      20200087977 A    7/2020
KR        102775064 B1   3/2025
WO        2019226474 A1  11/2019

OTHER PUBLICATIONS

Final Office Action notified Jul. 22, 2025 for U.S. Appl. No. 19/080,452.
        (Continued)

*Primary Examiner* — Monica M Pyo
(74) *Attorney, Agent, or Firm* — Mughal Gaudry & Franklin PC

(57)         ABSTRACT

Techniques are provided for producing an answer to a question regarding a domain. A natural-language textual sequence representing the question is received. From a knowledge graph associated with the domain, first and second textual passages are received using rankings corresponding to the natural-language textual sequence, a first textual summary is received summarizing textual information in a first vicinity of the first textual passage, and a second textual summary summarizing textual information in a vicinity of the second textual passage is received. An answer to the question is obtained using a language model by encoding a first intermediate output based on the natural-language textual sequence, the first textual passage, and the first textual summary, encoding a second intermediate output based on the natural language textual sequence, the second textual passage, and the second textual summary, and decoding a concatenation of the first and second intermediate outputs. An output is provided.

18 Claims, 10 Drawing Sheets

(51) Int. Cl.

| | |
|---|---|
| *G06F 16/34* | (2019.01) |
| *G06F 40/30* | (2020.01) |
| *G06F 40/40* | (2020.01) |
| *G06N 5/04* | (2023.01) |

(58) Field of Classification Search

USPC .......................................................... 707/738

See application file for complete search history.

(56) References Cited

U.S. PATENT DOCUMENTS

| | | | | |
|---|---|---|---|---|
| 10,019,513 | B1 * | 7/2018 | Koren | G06F 16/3344 |
| 10,180,964 | B1 | 1/2019 | Baker et al. | |
| 10,572,516 | B2 * | 2/2020 | Walia | G06Q 30/016 |
| 10,678,821 | B2 | 6/2020 | Carmeli et al. | |
| 10,817,576 | B1 | 10/2020 | Davidovich et al. | |
| 10,909,157 | B2 | 2/2021 | Paulus et al. | |
| 12,259,914 | B1 | 3/2025 | Gao et al. | |
| 2007/0179944 | A1 | 8/2007 | Van Dyke Parunak et al. | |
| 2016/0267117 | A1 | 9/2016 | Guggilla et al. | |
| 2018/0307776 | A1 | 10/2018 | Ferradini et al. | |
| 2018/0336183 | A1 | 11/2018 | Lee et al. | |
| 2019/0005024 | A1 * | 1/2019 | Somech | H04L 67/14 |
| 2019/0206517 | A1 | 7/2019 | Devarakonda et al. | |
| 2020/0074322 | A1 | 3/2020 | Chungapalli et al. | |
| 2021/0191937 | A1 | 6/2021 | Jia et al. | |
| 2021/0192126 | A1 | 6/2021 | Gehrmann et al. | |
| 2021/0295822 | A1 | 9/2021 | Tomkins et al. | |
| 2022/0277135 | A1 * | 9/2022 | Kryscinski | G06F 16/345 |
| 2023/0267275 | A1 * | 8/2023 | Au | G06N 5/025 |
| | | | | 704/9 |
| 2023/0420146 | A1 * | 12/2023 | Jegannathan | G06F 40/279 |
| 2024/0095460 | A1 | 3/2024 | Xu et al. | |
| 2024/0168984 | A1 | 5/2024 | Kim et al. | |
| 2025/0061291 | A1 * | 2/2025 | Gardner | G06F 40/56 |
| 2025/0272276 | A1 | 8/2025 | Ban et al. | |
| 2025/0272508 | A1 | 8/2025 | Russell | |
| 2025/0308120 | A1 | 10/2025 | Dai et al. | |

OTHER PUBLICATIONS

Non-Final Office Action for U.S. Appl. No. 19/080,452, dated Apr. 28, 2025.

Non-Final Office Action for U.S. Appl. No. 19/080,459, dated May 8, 2025.

Non-Final Office Action for U.S. Appl. No. 19/080,464, dated May 28, 2025.

Non-Final Office Action for U.S. Appl. No. 19/080,465, dated May 23, 2025.

Zhu, Tianyu, et al. "Summarizing long-form document with rich discourse information." Proceedings of the 30th ACM international conference on information & knowledge management. 2021. (Year: 2021).

Final Office Action for U.S. Appl. No. 19/080,464 notified Nov. 18, 2025.

Final Office Action notified Oct. 10, 2025 for U.S. Appl. No. 19/080,465.

Non-Final Office Action for U.S. Appl. No. 19/080,459 notified Sep. 11, 2025.

Notice of Allowance for U.S. Appl. No. 19/080,459 notified Jan. 30, 2026.

Notice of Allowance for U.S. Appl. No. 19/080,452 notified Nov. 28, 2025.

* cited by examiner

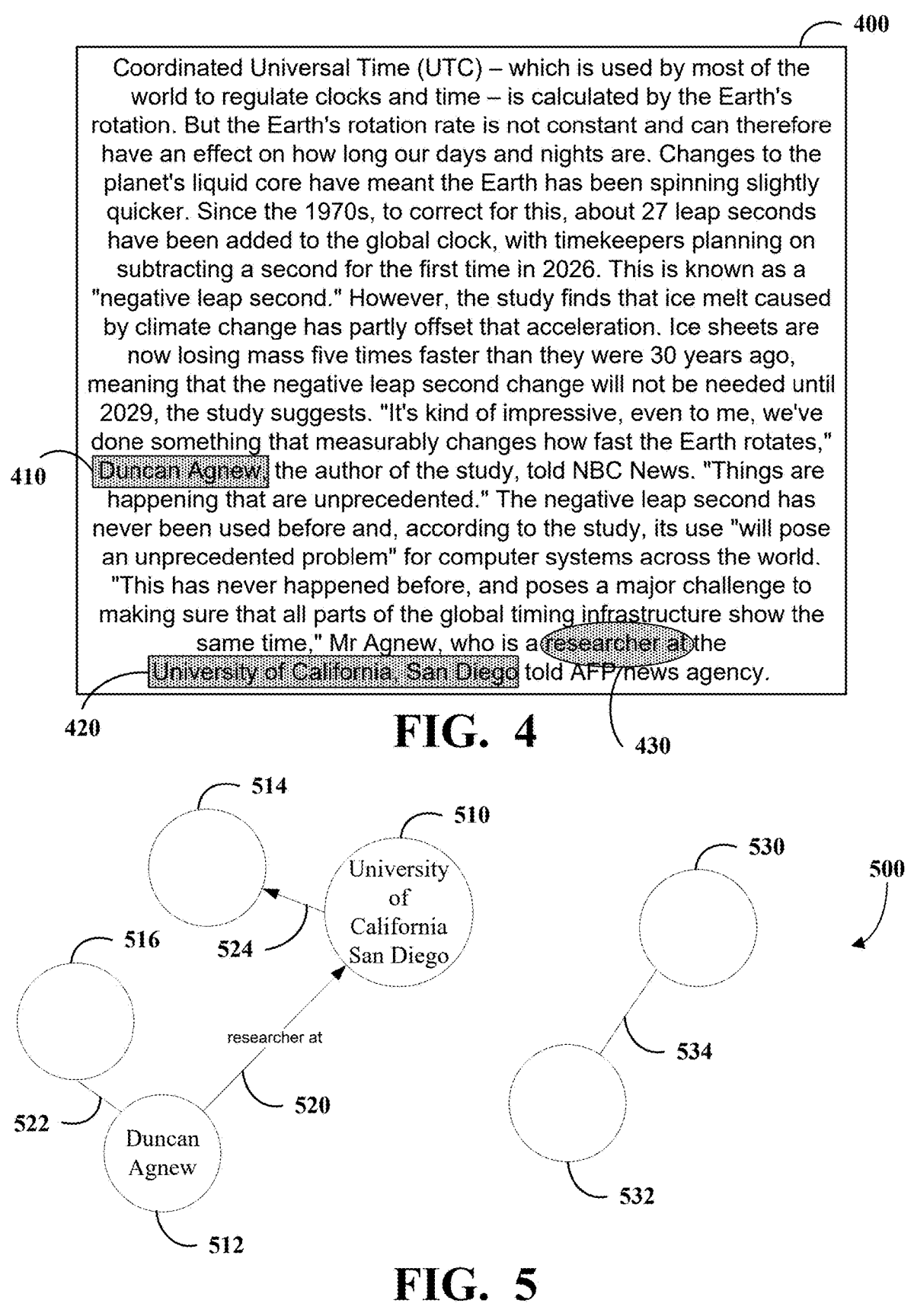

400

410

Coordinated Universal Time (UTC) – which is used by most of the world to regulate clocks and time – is calculated by the Earth's rotation. But the Earth's rotation rate is not constant and can therefore have an effect on how long our days and nights are. Changes to the planet's liquid core have meant the Earth has been spinning slightly quicker. Since the 1970s, to correct for this, about 27 leap seconds have been added to the global clock, with timekeepers planning on subtracting a second for the first time in 2026. This is known as a "negative leap second." However, the study finds that ice melt caused by climate change has partly offset that acceleration. Ice sheets are now losing mass five times faster than they were 30 years ago, meaning that the negative leap second change will not be needed until 2029, the study suggests. "It's kind of impressive, even to me, we've done something that measurably changes how fast the Earth rotates," Duncan Agnew the author of the study, told NBC News. "Things are happening that are unprecedented." The negative leap second has never been used before and, according to the study, its use "will pose an unprecedented problem" for computer systems across the world. "This has never happened before, and poses a major challenge to making sure that all parts of the global timing infrastructure show the same time," Mr Agnew, who is a researcher at the University of California, San Diego told AFP news agency.

University of California San Diego

524

516

530

534

522

520 researcher at

532

512

Duncan Agnew

FIG. 5

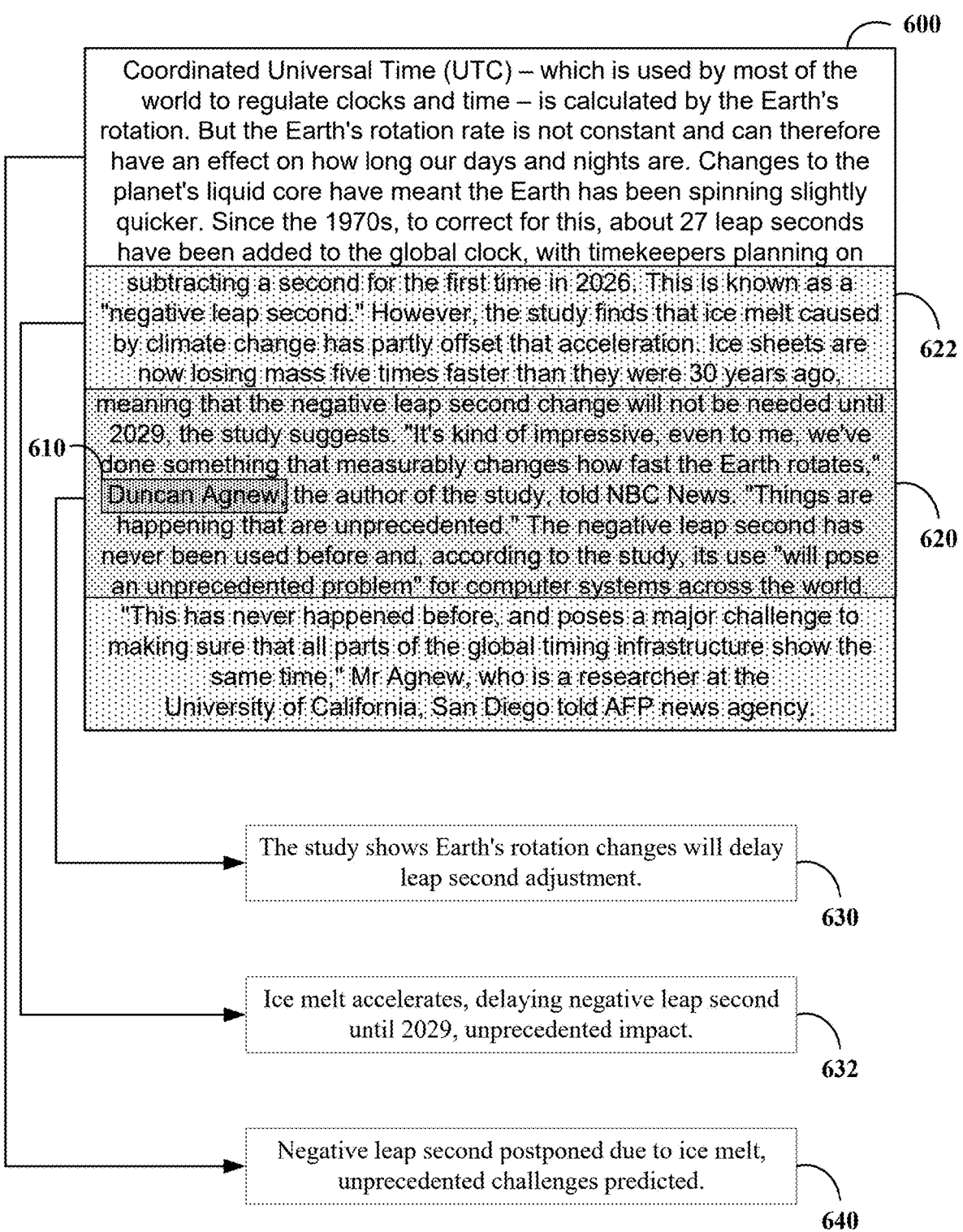

Coordinated Universal Time (UTC) – which is used by most of the world to regulate clocks and time – is calculated by the Earth's rotation. But the Earth's rotation rate is not constant and can therefore have an effect on how long our days and nights are. Changes to the planet's liquid core have meant the Earth has been spinning slightly quicker. Since the 1970s, to correct for this, about 27 leap seconds have been added to the global clock, with timekeepers planning on subtracting a second for the first time in 2026. This is known as a "negative leap second." However, the study finds that ice melt caused by climate change has partly offset that acceleration. Ice sheets are now losing mass five times faster than they were 30 years ago, meaning that the negative leap second change will not be needed until 2029, the study suggests. "It's kind of impressive, even to me, we've done something that measurably changes how fast the Earth rotates," Duncan Agnew the author of the study, told NBC News. "Things are happening that are unprecedented." The negative leap second has never been used before and, according to the study, its use "will pose an unprecedented problem" for computer systems across the world. "This has never happened before, and poses a major challenge to making sure that all parts of the global timing infrastructure show the same time," Mr Agnew, who is a researcher at the University of California, San Diego told AFP news agency.

The study shows Earth's rotation changes will delay leap second adjustment.

Ice melt accelerates, delaying negative leap second until 2029, unprecedented impact.

Negative leap second postponed due to ice melt, unprecedented challenges predicted.

RECEIVING A NATURAL LANGAUGE TEXTUAL SEQUENCE REPRESENTING A QUESTION FROM A USER

904

RETRIEVING TEXTUAL PASSAGES AND TEXTUAL SUMMARIES FROM KNOWLEDGE GRAPH

906

OBTAINING AN ANSWER TO THE QUESTION FROM A LANGAUGE MODEL BASED ON THE QUESTION, TEXTUAL PASSAGES, AND TEXTUAL SUMMARIES

908

PROVIDING AN OUTPUT BASED ON THE ANSWER

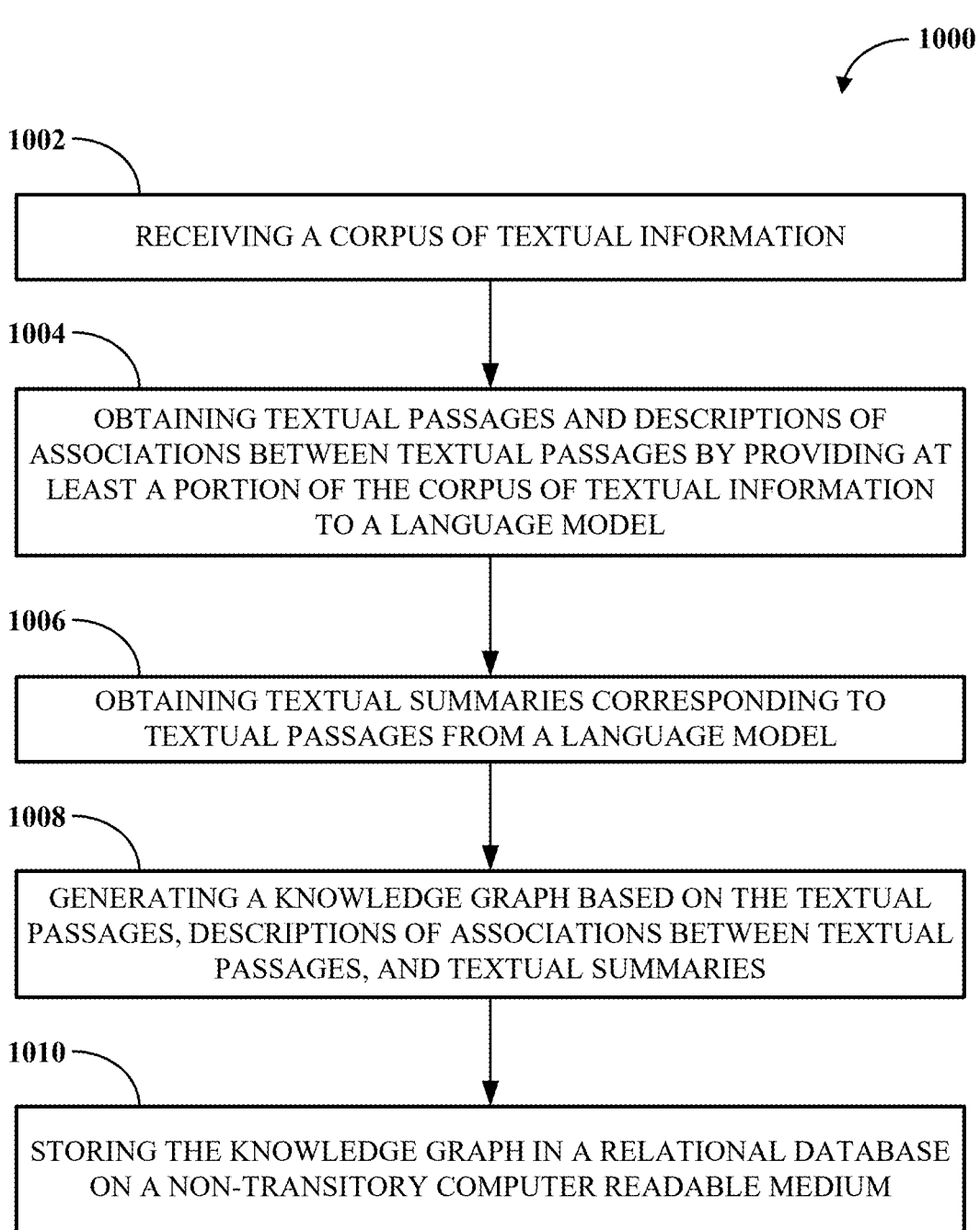

1000

1002
RECEIVING A CORPUS OF TEXTUAL INFORMATION

1004
OBTAINING TEXTUAL PASSAGES AND DESCRIPTIONS OF ASSOCIATIONS BETWEEN TEXTUAL PASSAGES BY PROVIDING AT LEAST A PORTION OF THE CORPUS OF TEXTUAL INFORMATION TO A LANGUAGE MODEL

1006
OBTAINING TEXTUAL SUMMARIES CORRESPONDING TO TEXTUAL PASSAGES FROM A LANGUAGE MODEL

1008
GENERATING A KNOWLEDGE GRAPH BASED ON THE TEXTUAL PASSAGES, DESCRIPTIONS OF ASSOCIATIONS BETWEEN TEXTUAL PASSAGES, AND TEXTUAL SUMMARIES

1010
STORING THE KNOWLEDGE GRAPH IN A RELATIONAL DATABASE ON A NON-TRANSITORY COMPUTER READABLE MEDIUM

FIG. 10

NATURAL LANGUAGE GENERATION USING KNOWLEDGE GRAPH INCORPORATING TEXTUAL SUMMARIES

CROSS-REFERENCE TO RELATED APPLICATIONS

This application claims priority to U.S. Provisional Patent Application No. 63/654,558, filed on May 31, 2024, titled "NATURAL LANGUAGE GENERATION USING KNOWLEDGE GRAPH INCORPORATING TEXTUAL SUMMARIES" which is incorporated by reference in its entirety for all purposes.

BACKGROUND

Natural language generation systems including Question-Answer (QA) systems allow a user to specify an input, such as a question in natural language form and receive an output, such as an appropriate answer from the system. For example, a user might ask a question such as "What was George Washington's wife's name?" and receive the answer "Martha Washington," or "I really liked to play the game 'Monopoly' when I was a kid, but I could never win. What's a good strategy?" and receive the answer "Try buying the orange properties-they are well situated to receive rent."

SUMMARY

In some embodiments, a computer-implemented method is provided for producing an answer to a question relating to a domain. A natural-language textual sequence representing the question is received. From a knowledge graph associated with the domain, a first textual passage and a second textual passage are received based on rankings with respect to the natural-language textual sequence, a first textual summary is received that summarizes textual information in a first vicinity of the first textual passage, and a second textual summary that summarizes textual information in a vicinity of the second textual passage is received. An answer to the question is obtained using a language model by encoding a first intermediate output based on the natural-language textual sequence, the first textual passage, and the first textual summary, encoding a second intermediate output based on the natural language textual sequence, the second textual passage, and the second textual summary, and decoding a concatenation of the first intermediate output and the second intermediate output. An output is provided a user based on the answer.

The retrieving may further include retrieving, from the knowledge graph associated with the domain a third textual passage based on a first ranking with respect to a relationship of the third textual passage and the natural language textual sequence and a third textual summary summarizing textual information in a vicinity of the third textual passage.

Obtaining an answer to the question using the language model may further include encoding a third intermediate output based on the natural language textual sequence, the third textual passage, and the third textual summary.

Retrieving may include retrieving, from the knowledge graph associated with the domain a fourth textual summary based on a second ranking with respect to the fourth textual summary and the natural language textual sequence, wherein obtaining an answer to the question using the language model further includes encoding a fourth intermediate output based on the natural language textual sequence and the fourth textual summary.

The concatenation may include at least one of the third intermediate output and the fourth intermediate output.

The knowledge graph may include a tree corresponding to a first document of textual information, a root of the tree corresponding to a summary of the first document, nodes of the tree corresponding to textual summaries of portions of the first document, and leaves of the tree corresponding to textual passages of the first document, wherein the first textual passage corresponds to a first leaf of the tree and the first textual summary corresponds to a first node of the tree connected to the first leaf, wherein retrieving further includes retrieving, from the knowledge graph associated with the domain the summary of the first document corresponding to the root of the tree and a fifth textual summary summarizing textual information in a second vicinity of the first textual passage, wherein encoding the first intermediate output is further based on the summary of the first document and the fifth textual summary, wherein the first vicinity includes a first set of textual information and the second vicinity includes the first set of textual information and a second set of textual information.

In some embodiments, a system is provided that includes one or more data processors and a non-transitory computer readable storage medium containing instructions which, when executed on the one or more data processors, cause the one or more data processors to perform part or all of one or more methods disclosed herein.

In some embodiments, a computer-program product tangibly embodied in a non-transitory machine-readable storage medium, including instructions configured to cause one or more data processors to perform part or all of one or more methods or processes disclosed herein.

In some embodiments, a system is provided that includes one or more means to perform part or all of one or more methods or processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification and variation of the concepts herein disclosed may be resorted to by those skilled in the art, and that such modifications and variations are considered to be within the scope of this invention as defined by the appended claims.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 4 is an illustration of a document, textual passages, and a relationship according to implementations of this disclosure.

FIG. 5 is an illustration of a knowledge graph according to implementations of this disclosure.

FIG. 6 is an illustration of a document, textual passage, and summaries according to implementations of this disclosure.

FIG. 10 is a flowchart of an example of a technique for generating a knowledge graph including textual passages and textual summaries usable for producing an answer to a question relating to a domain in accordance with implementations of this disclosure.

DETAILED DESCRIPTION

Figure 1:
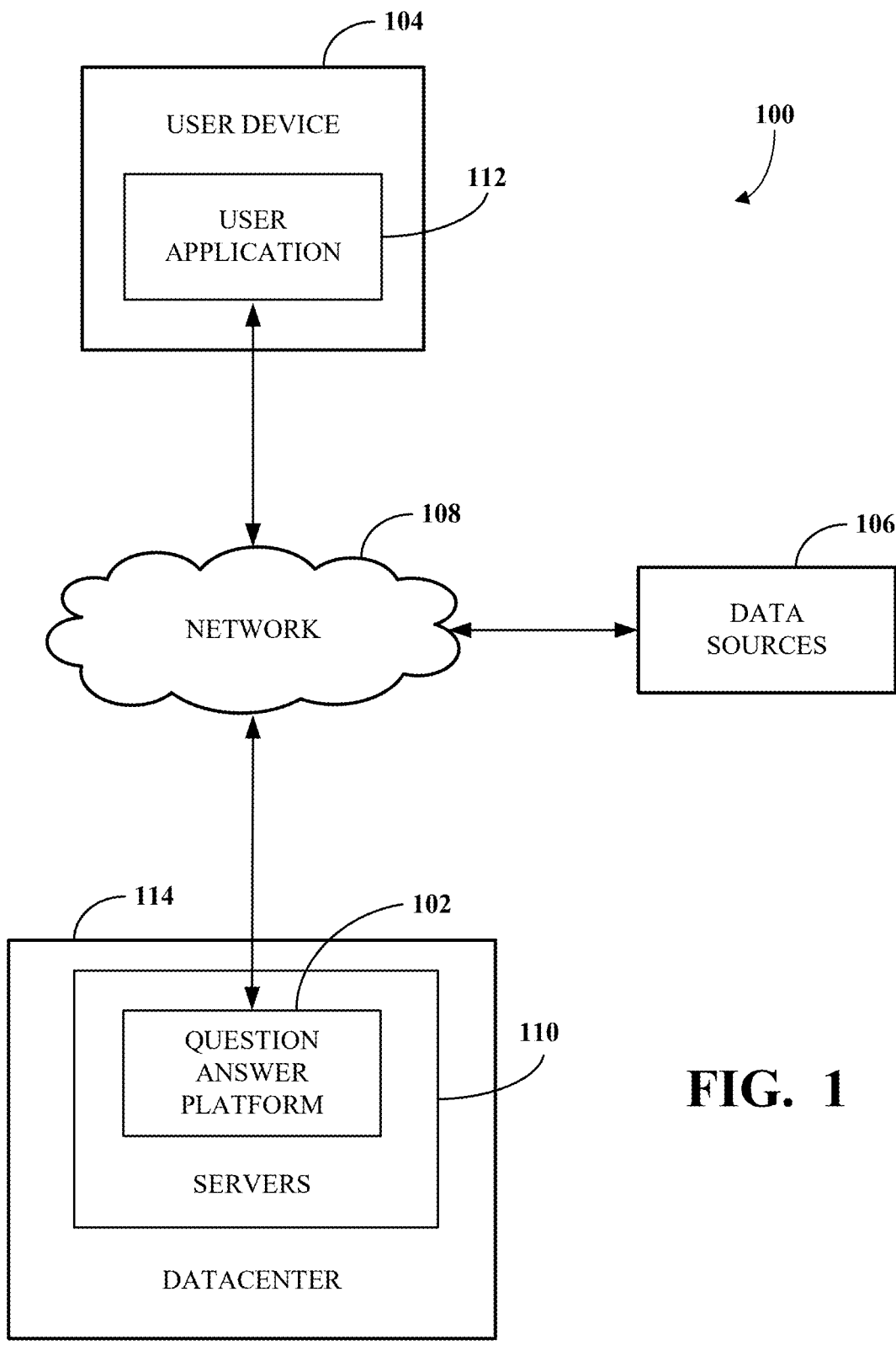
FIG. 1 is a block diagram of an example of a computing system which includes a question answer platform according to implementations of this disclosure.

Aspects of this disclosure relate to natural language generation such as question answering (QA) using a knowledge graph incorporating textual summaries. QA generally includes providing a natural-language question to a language model which infers a textual answer to the provided question. Natural language generation generally includes providing a natural-language input to a language model which infers a textual output. A language model is a computational model executed by one or more computing devices that is designed to generate a natural-language output based on a natural-language input. Language models utilize neural network architectures such as transformers to process textual information.

In an example of a language model, a natural-language input is tokenized into smaller units, such as words, subwords, or characters. Tokens are converted into numerical representations such as by using an embedding layer which maps tokens to a high dimensional vector (e.g., a series of numbers). This high dimensional vector numerically represents the semantic meaning of a token, the context of a token, and relationships between tokens in a more compact representation that can be processed by the language model.

A language model may include one or more layers of encoders and/or decoders. An encoder processes an input sequence of vectors and generates a content-rich representation. For example, an encoder may utilize techniques such as a self attention (which produces output based on relationships between multiple tokens in an input sequence), multi-head attention (which includes utilizing an attention mechanism multiple times independently and then concatenating and transforming their outputs), feed-forward networks, residual connections and layer normalization. A decoder generates an output sequence based on an encoder output and/or previously generated tokens. For example, a decoder may utilize techniques such as masked self attention (so that predictions for a given position can only depend on previous positions in the output), encoder-decoder attention (which permits the decoder to focus on relevant parts of the encoder output), feed-forward networks, residual connections, and layer normalization. The final decoder layer output is used to determine probabilities of successive output tokens which are used to determine the output text.

A language model may be trained on a large corpus of text to learn statistical properties and patterns of natural language, enabling the language model to perform various natural-language processing tasks. For example, this training process may allow a language model to retain information needed to answer an input question and produce an output answer. In some cases, the training dataset may not include information needed to answer a question (for example, in the case of a foundational model). In such cases, relevant information or context may be incorporated into the model through the process of fine tuning (e.g., additional training) or provided in the input to the model (which may also be referred to as a prompt). For example, retrieval augmented generation (RAG) techniques may use a vector database of high-dimensional vectors (e.g., embeddings) which represent information that can be queried and selectively included in a prompt as context.

Language models used for QA have large numbers of parameters (e.g., in the billions or trillions) and are executed by processors capable of billions or trillions of floating-point operations per second (FLOPS). While smaller language models may be capable of execution using a central processing unit (CPU), execution of language models used in QA systems typically are carried out by graphics processing units (GPUs) or specialized tensor processing units (TPUs) designed to perform matrix operations utilized by language models in parallel (e.g., hundreds or thousands of operations in parallel) and at higher throughput than CPUs. The compute required to infer an answer from an input question using a language model may be based on the number of parameters of the language model (for example, approximately two times the number of parameters). By contrast, the compute required to train a language model is proportionate to the size of the training data and for larger models may utilize many GPUs or TPUs (e.g., hundreds or thousands) over a substantial time period (e.g., days, weeks, or months).

The usability of QA systems that utilize language models are constrained by several factors. For example, language models that can provide high-quality answers require enormous computation and power resources, both in their training and in their runtime application. Additionally, due to the substantial resources, time, and sophistication required to train language models, there are substantial barriers to re-training and fine-tuning language models with domain specific information. Language models may thus be lacking information necessary to provide answers at a desired level of quality or detail. Further, it may be infeasible to obtain or utilize certain important information (e.g., proprietary information) for training or fine-tuning. Furthermore, language models have a limited input size (e.g., context window) and the training process used for some language models may not easily permit the processing of documents over a certain length.

Techniques such as RAG which, for example may include pre-populating a vector database with pre-generated embeddings representing information not otherwise available to the language model, searching the vector database at inference time to locate potentially relevant information, and including such embeddings in the input to the model have several downsides. For example, vector databases can utilize substantial compute, power, and memory resources to operate as compared to traditional databases and consume substantial compute, power, and memory resources to generate the embeddings that are stored in the vector database. Furthermore, retrieval from a vector database depends on a comparison of similarity between an embedding based on the question and the stored embeddings which may not consider available context (e.g., relationships between text and summaries of text) thus resulting in the retrieval of incomplete information or information lacking context. Furthermore, conventional RAG techniques may be ineffective at retrieving the most relevant data because data can often be very sparse or dense.

Problems such as these may be mitigated by using a knowledge graph incorporating textual summaries to provide improved input context to a language model which may utilize less resources, such as computing, memory, and power. The quality of an answer in part depends on the quality of retrieval of relevant information, so improving the retrieval of information may also improve the quality of the resulting answer. In implementations of this disclosure, answer questions in a particular domain, a knowledge graph may be generated or provided based on documents that include information relevant to that domain. For example, information for a given document may be added to a knowledge graph by providing that document to a language model that is trained to produce as output entities (e.g., textual passages) and relationships between entities that found in the input document as a structured output, such as in JavaScript Object Notation (JSON). In some implementations, this language model may be a decoder-only model and may be designed to produce the desired output without instructions in a prompt and without a pre-determined ontology. In some implementations, the resulting knowledge graph may be able to capture relationships between textual passages across several dimensions. The resulting knowledge graph may be able to more effectively store numerical data, tables, and code as compared to conventional techniques.

In implementations of this disclosure, the knowledge graph may be further generated or provided to include textual summaries and/or document summaries in addition to textual passages and relationships between textual passages. For example, a textual summary may be generated based on a portion of an input document and/or a subset of textual passages or relationships. Multiple levels of textual summaries may be generated to provide different degrees of summarization (e.g., compression) of the input document. At a document level, a document summary may be generated or provided that summarizes an entire document.

Textual summaries and document summaries may be generated using a language model trained to summarize text. In some implementations, this language model may be a decoder-only model and may be designed to produce the desired summaries without instructions in a prompt. In some implementations, the language model may be designed to take into account previously generated summaries at a higher level or a lower level in order to reduce duplication of information included in summaries between levels. Summaries and passages may be organized in a tree format in the knowledge graph, with a document summary at a root node, textual passages at leaf nodes, and successive levels of textual summaries in between the root node and the leaves.

The generation of summaries for inclusion in the knowledge graph in effect compresses input documents at varying levels to enable targeted retrieval of information later without having to store the input documents or generate summaries when a question is being answered. This may enable the use of summaries in a more compute, memory, and time efficient manner.

In implementations of this disclosure, after a natural language textual sequence representing a question is received from a user, information is retrieved from the knowledge graph to be included as input to a language model to obtain an answer to the question. The information retrieved can include textual passages related to the question, textual passages having a relationship with retrieved textual passages, relationships related to the question and associated textual passages, textual summaries related to retrieved textual passages, textual summaries related to the question, or combinations thereof.

For example, a textual passage may be retrieved based on a ranking calculated for the textual passage with respect to the natural language textual sequence. For example, rankings may be calculated for several textual passages stored in the knowledge graph with respect to the natural language textual sequence and the textual passages having the highest rankings may be retrieved. For example, when a textual passage is retrieved, textual summaries between a leaf in a tree of summaries to which the textual passage is associated and a root of the tree may be retrieved along with a document summary associated with the root of the tree.

For example, a textual passage may be retrieved based on a ranking calculated for a relationship of the textual passage with respect to the natural language textual sequence. Textual summaries and a document summary connected to the retrieved textual passage via a tree of summaries may also be retrieved. In some implementations, previously retrieved summaries may be tracked and not retrieved again.

For example, a textual summary or document summary may be retrieved based on a ranking calculated for the textual summary or document summary with respect to the natural language textual sequence.

In implementations of this disclosure, the retrieved passages and summaries may be provided as input to a language model along with the question to obtain an answer. In some implementations, the language model is an encoder-decoder model (that includes both encoder layers and decoder layers). In some implementations, certain passages or summaries may be encoded separately into respective intermediate outputs using one or more encoder layers and the intermediate outputs concatenated for processing by one or more decoder layers. In some implementations, one or more of the intermediate outputs are encoded also based on the natural language textual sequence. For example, a retrieved textual passage, textual and document summaries associated with the textual passage, and text based on the natural language textual sequence may be encoded jointly into a single intermediate output. In some implementations, the intermediate outputs are re-ranked, and only some of the intermediate outputs are concatenated and input to one or more decoder layers for processing.

Depending on the implementation, questions and answers may take different forms such as a question including text requesting a particular fact and an answer including text providing a fact in response. For example, in some implementations, a question and its associated answer supports improved collaboration by providing insights into team interactions, project statuses, tasks, communications, and contributions. For example, a question might include a query relating to a project or a collaboration and the answer might provide relevant information relating to the project or collaboration without providing or in addition to providing a factual answer to a specific factual question. For example, in some implementations, a question and its associated answer supports contextual recommendations or insights such as by processing the question based on retrieved knowledge graph information to provide insights or context that might be relevant to the question without providing or in addition to providing a direct answer to the stated question. For example, a language model might identify in an answer a potentially relevant question not asked or documents, information related to recent interactions, or contact information that might be relevant to an upcoming meeting. For example, in some implementations, a question and its associated answer supports summarization of information including that retrieved from a knowledge graph to provide a condensed presentation of information in the text of an answer in response to the provided question.

Depending on the implementation, natural language generation may include taking an unstructured text input and generating a semantically structured input. For example, an unstructured input may include a request for a report, and a language model may generate the requested report based on the request and retrieved knowledge graph information.

To describe some implementations in greater detail, reference is first made to examples of hardware and software structures used to implement a system for question answering. FIG. 1 is a block diagram of an example of a computing system 100 which includes a question answer platform 102. The question answer platform 102 includes software for obtaining answers to questions and may include, for example software for generating knowledge graphs including textual passages and textual summaries and language models including an encoder-decoder model that takes as input text representing a question and information retrieved from the knowledge graph to obtain an answer. A user of the question answer platform 102, such as a user of a user device 104, can configure the question answer platform 102 to obtain documents from one or more data sources 106 over a network 108 to generate a knowledge graph representative of such documents. Documents may include, for example, files, user profiles, tasks, communication logs, objects, or another ascertainable collection of data. For example, a document may be retrieved by way of a connection to a software-as-a-service application, such as a cloud storage service, a customer relationship management (CRM) service, or other application software such as one that has an API that enables retrieval of data relating to such application. Data sources 106 may also include one or more computing devices or cloud computing instances that store data usable for generating a knowledge graph.

The user device 104 is a computing device capable of accessing the question answer platform 102 over the network 108, which may be or include, for example, the Internet, a local area network (LAN), a wide area network (WAN), a virtual private network (VPN), or another public or private means of electronic computer communication. For example, the user device 104 may be a mobile phone, a tablet computer, a laptop computer, a notebook computer, a desktop computer, or another suitable computing device. In some cases, the user device 104 may be registered to or otherwise associated with a customer of the question answer platform 102. The question answer platform 102 may be created and/or operated by a service provider and may have one or more customers, which may each be a public entity, private entity, or another corporate entity or individual that purchases or otherwise uses software services of the question answer platform 102. Without limitation, the question answer platform 102 can support hundreds or thousands of customers, and each of the customers may be associated with one or more user devices, such as the user device 104.

The question answer platform 102 is implemented using one or more servers 110, such as application servers and database servers. The servers 110 can each be a computing device or system, which can include one or more computing devices, such as a desktop computer, a server computer, or another computer capable of operating as a server, or a combination thereof. In some implementations, one or more of the servers 110 can be a software implemented server implemented on a physical device, such as a hardware server. In some implementations, a combination of two or more of servers 110 can be implemented as a single hardware server or as a single software server implemented on a single hardware server. For example, an application server and a database server can be implemented as a single hardware server or as a single software server implemented on a single hardware server. In some implementations, the servers 110 can include servers other than application servers and database servers, for example, media servers, proxy servers, and/or web servers.

For example, an application server may run software services deliverable to user devices such as the user device 104. For example, the application servers of the servers 110 can implement web server software to provide user access to provide questions to and receive answers from question answer platform 102. For example, the application servers of the servers 110 can implement software to retrieve data from data sources 106 and process such data to generate a knowledge graph. For example, the application servers of servers 110 may include several language models. For example, in some implementations, a database server may include a relational database where the knowledge graph may be stored. In some implementations, different database technology may be utilized, such as database software specifically designed to store graphs.

In some implementations, the question answer platform 102 may be on-premises software run at a site operated by a private or public entity or individual associated with the user device 104. For example, the data sources 106 may in whole or in part be sources available at that site and then network 108 may be a LAN which connects the data sources 106 with the servers 110.

Depending on the implementation, question answer platform 102 may include inferring a textual output from a natural-language input in addition to or instead of providing an answer to a question. In some implementations, question answer platform 102 may instead be referred to as a natural language generation platform or a semantic structuring platform.

In some implementations, an instance of the question answer platform can be implemented in whole or in part in a public or private cloud including servers that provides compute, memory, network, and other resources as a service. For example, an instance may be used to provide question answer services to a single customer (e.g., single-tenant) or multiple customers (e.g., multi-tenant). In the case where a multi-tenant configuration is utilized, technological measures may be put in place to prevent data related to one customer from being used for or disclosed to another customer.

The servers 110 are located at a datacenter 114. The datacenter 114 can represent a geographic location, which can include a facility, where the one or more servers are located. Although a single datacenter 114 including one or more servers 110 is shown, the computing system 100 can include a number of datacenters and servers or can include a configuration of datacenters and servers different from that generally illustrated in FIG. 1. For example, and without limitation, the computing system 100 can include tens of datacenters, and at least some of the datacenters can include hundreds or another suitable number of servers. In some implementations, the datacenter 114 can be associated or communicate with one or more datacenter networks or domains. In some implementations, such as where the question answer platform 102 is on-premises software, the datacenter 114 may be omitted.

The network 108, the datacenter 114, or another element, or combination of elements, of the system 100 can include network hardware such as routers, switches, other network devices, or combinations thereof. For example, the datacenter 114 can include a load balancer for routing traffic from the network 108 to various ones of the servers 110. The load balancer can route, or direct, computing communications traffic, such as signals or messages, to respective ones of the servers 110. For example, the load balancer can operate as a proxy, or reverse proxy, for a service, such as a service provided to user devices such as the user device 104 by the servers 110. Routing functions of the load balancer can be configured directly or via a domain name service (DNS). The load balancer can coordinate requests from user devices and can simplify access to the question answer platform 102 by masking the internal configuration of the datacenter 114 from the user devices. In some implementations, the load balancer can operate as a firewall, allowing or preventing communications based on configuration settings. In some implementations, the load balancer can be located outside of the datacenter 114, for example, when providing global routing for multiple datacenters. In some implementations, load balancers can be included both within and outside of the datacenter 114.

Figure 2:
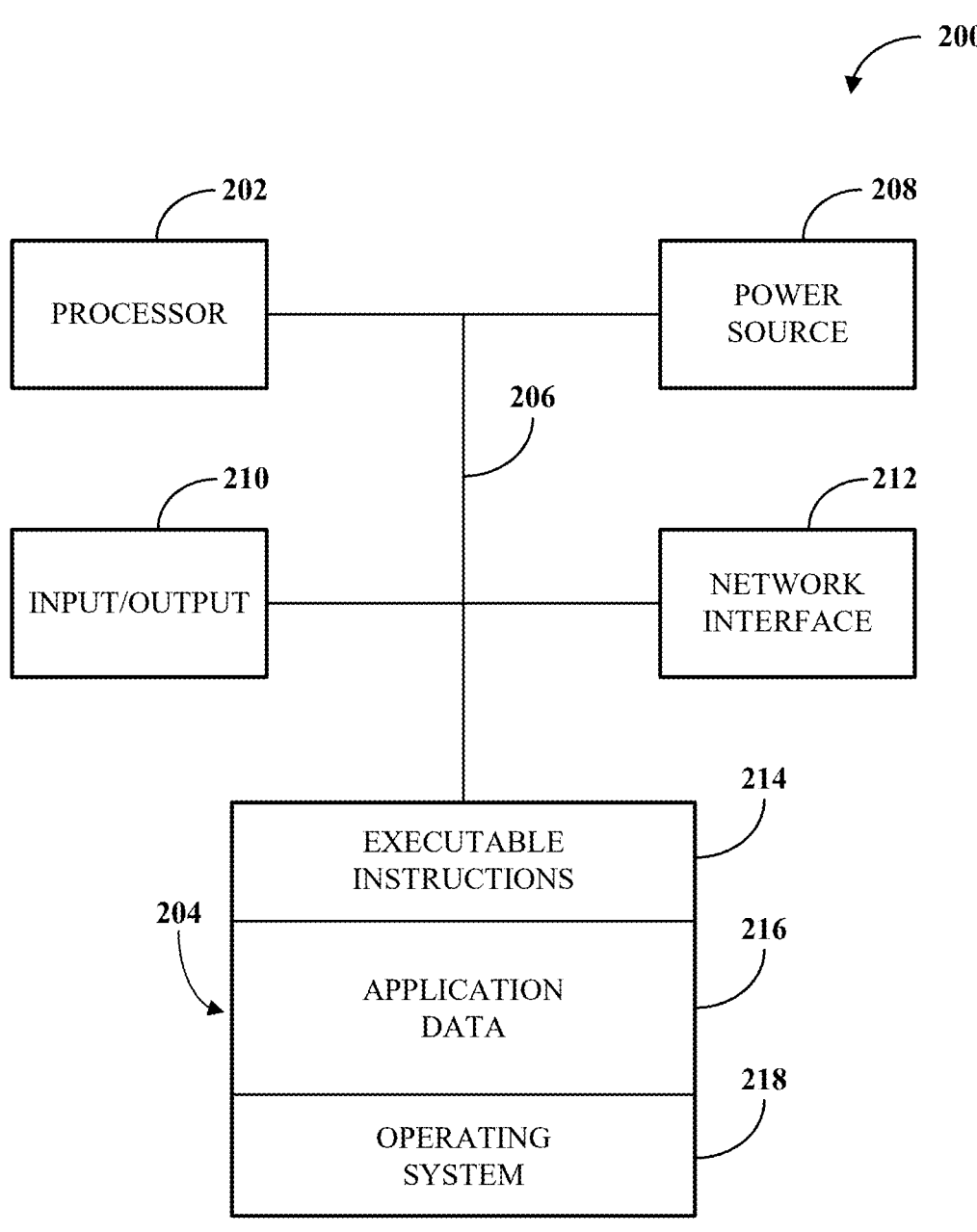
FIG. 2 is a block diagram of an example of an internal configuration of a computing device usable in a computing system according to implementations of this disclosure.

FIG. 2 is a block diagram of an example internal configuration of a computing device 200 usable with a computing system, such as the computing system 100 shown in FIG. 1. The computing device 200 may, for example, implement one or more of the user device 104 or one of the servers 110 of the computing system 100 shown in FIG. 1.

The computing device 200 includes components or units, such as a processor 202, a memory 204, a bus 206, a power source 208, input/output devices 210, a network interface 212, other suitable components, or a combination thereof. One or more of the memory 204, the power source 208, the input/output devices 210, or the network interface 212 can communicate with the processor 202 via the bus 206.

The processor 202 may include a central processing unit, such as a microprocessor, and can include single or multiple processors having single or multiple processing cores. The processor 202 may also include a GPU or TPU that is optimized to perform calculations needed to operate a language model. Alternatively, the processor 202 can include another type of device, or multiple devices, now existing or hereafter developed, configured for manipulating or processing information. For example, the processor 202 can include multiple processors interconnected in one or more manners, including hardwired or networked, including wirelessly networked. For example, the operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory of the memory 204 can be random access memory (RAM) (e.g., a DRAM module, such as DDR SDRAM) or another form of volatile memory. In another example, the non-volatile memory of the memory 204 can be a disk drive, a solid state drive, flash memory, phase-change memory, or another form of non-volatile memory configured for persistent electronic information storage. Generally speaking, with currently existing memory technology, volatile hardware provides for lower latency retrieval of data and is more scarce (e.g., due to higher cost and lower storage density) and non-volatile hardware provides for higher latency retrieval of data and has greater availability (e.g., due to lower cost and high storage density). The memory 204 may also include other types of devices, now existing or hereafter developed, configured for storing data or instructions for processing by the processor 202. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 214, application data 216, and an operating system 218. The executable instructions 214 can include one or more application programs, which can be loaded or copied, in whole or in part, from non-volatile memory to volatile memory to be executed by the processor 202. For example, the executable instructions 214 can include instructions for performing some or all of the techniques of this disclosure. The application data 216 can include user data, database data (e.g., database catalogs or dictionaries), or the like. In some implementations, the application data 216 can include functional programs, such as a web browser, a web server, a database server, another program, or a combination thereof. The operating system 218 can be, for example, Microsoft Windows®, Mac OS X®, or Linux®; an operating system for a mobile device, such as a smartphone or tablet device; or an operating system for a non-mobile device, such as a mainframe computer.

The power source 208 includes a source for providing power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The input/output devices 210 include one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 212 provides a connection or link to a network (e.g., the network 108 shown in FIG. 1). The network interface 212 can be a wired network interface or a wireless network interface. The computing device 200 can communicate with other devices via the network interface 212 using one or more network protocols, such as using Ethernet, transmission control protocol (TCP), internet protocol (IP), power line communication, an IEEE 802.X protocol (e.g., Wi-Fi, Bluetooth, ZigBee, etc.), infrared, visible light, general packet radio service (GPRS), global system for mobile communications (GSM), code-division multiple access (CDMA), Z-Wave, another protocol, or a combination thereof.

The foregoing description of computing device 200 includes a number of components that may be found in a computer. However, depending on the implementation, some components may be added, deleted, or modified. For example, in some implementations, (e.g., such as with respect to server 110), human interface devices (e.g., input/output devices 210) may be omitted.

Figure 3:
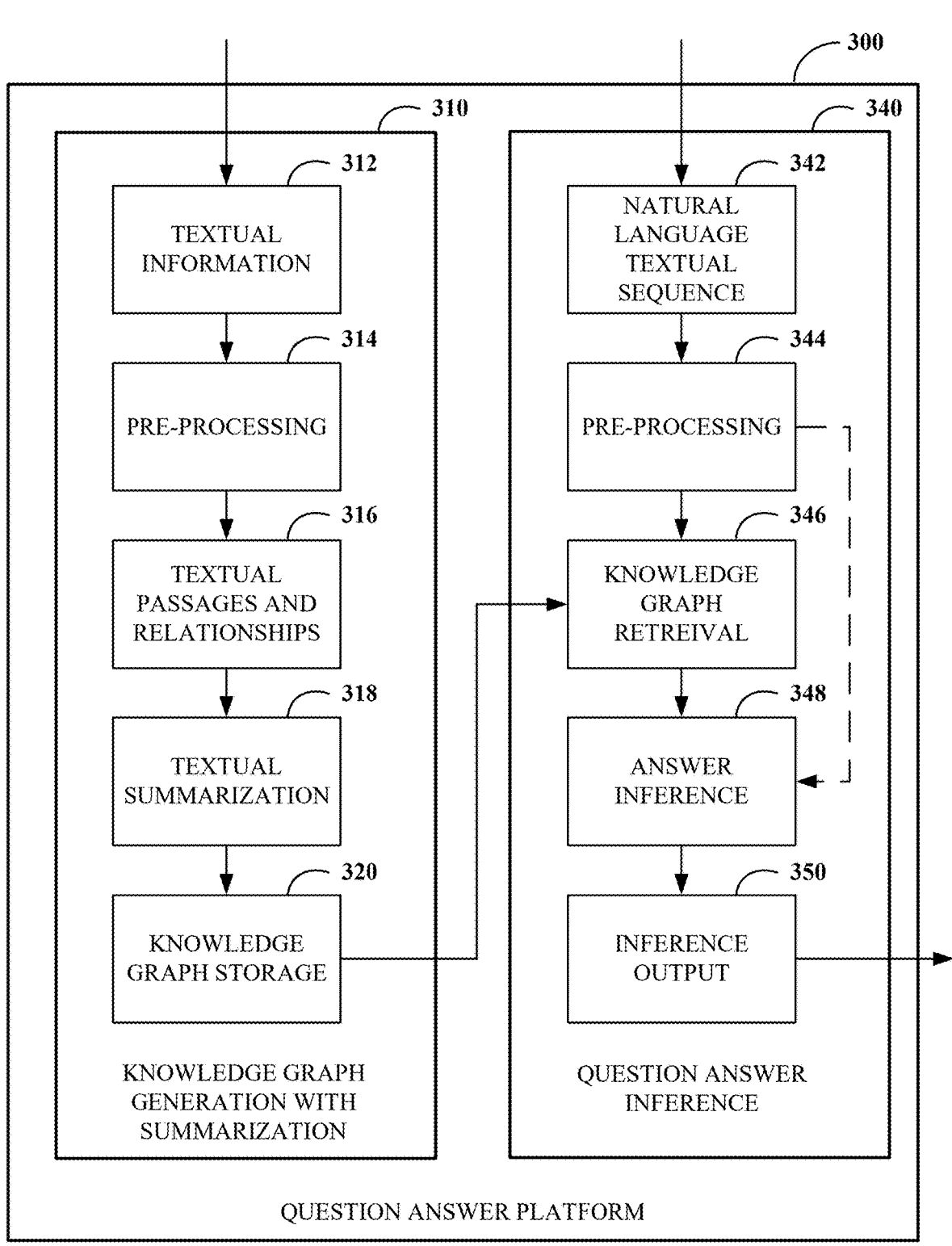
FIG. 3 is a block diagram of an example of a question answer platform according to implementations of this disclosure.

FIG. 3 is a block diagram of an example of a question answer platform 300, which may, for example, be the question answer platform 102 shown in FIG. 1. The question answer platform 300 is accessible by user devices, for example, the user device 104 using the web browser software 112 (or a client application, as applicable) shown in FIG. 1. The question answer platform 300 includes components for generating knowledge graphs and answering questions. As shown, the question answer platform 300 includes knowledge graph generation with summarization 310 including textual information 312, pre-processing 314, textual passages and relationship 316, textual summarization 318, and knowledge graph storage 320. As shown, the question answer platform 300 also includes question answer inference 340 which includes natural language textual sequence 342, pre-processing 344, knowledge graph retrieval 346, answer inference 348, and inference output 350.

As used herein, the term "component" can refer to a hardware component (e.g., infrastructure, such as a switch, router, server, modem, processor, integrated circuit, input/output interface, memory, storage, power supply, biometric reader, media reader, other sensor, or the like, or combinations thereof), a software component (e.g., a platform application, web application, client application, other software application, module, tool, routine, firmware process, or other instructions executable or interpretable by or in connection with one or more hardware components, or the like, or combinations thereof), or combinations thereof. A component can also refer to a computing feature such as a document, model, plan, socket, virtual machine, or the like, or combinations thereof. A component, such as a hardware component or a software component, can refer to a physical implementation (e.g., a computing device, such as is shown in FIG. 2) or a virtual implementation (e.g., a virtual machine, container, or the like that can, for example, execute on a physical device and mimic certain characteristics of a physical device) of one or more of the foregoing.

The components 310 through 350 may be implemented using one or more servers, for example, the servers 110 of the datacenter 114 shown in FIG. 1. In particular, one or more of the components 310 through 350 may be implemented using one or more application servers and database servers.

Knowledge graph generation with summarization 310 starts with textual information 312 receiving a corpus of textual information. The corpus of textual information may include several documents containing text. In some implementations, textual information 312 may receive textual information from one or more connections with data sources, such as data sources 106.

Pre-processing 314 may perform pre-processing steps on the received textual information. For example, if text in a document exceeds the context window of a language model, the document may be chunked into smaller-sized portions using a semantic chunking algorithm. For example, information (such as regulated information, such as personal information) may be removed from the textual information.

Textual passages and relationships 316 obtains textual passages and descriptions of associations between textual passages from a language model by providing at least a portion of the textual information (as and if modified by pre-processing 314) to the language model. In some implementations, the language model is a decoder-only model trained to produce textual passages and descriptions of relationships between passages from a textual input.

Textual summarization 318 obtains textual summaries and/or document summaries of textual information or portions thereof. For example, a document summary may be obtained from a large language model based on the text of a document in the corpus of textual information. For example, a textual summary may be obtained that summarizes text in a vicinity of one or more textual passages. The vicinity may, for example, be based on a certain number of tokens, words, or sentences that are before and/or after one or more textual passages. The certain number may be fixed or may be adaptive, such as based on a length of a document or a determination of an amount of text that has a certain relationship with the textual passage. For example, in a document that has structure indicating related text (e.g., sections, outlines, numbering, tables, rows, columns, or the like) such structure may be utilized to determine the text to be summarized.

Knowledge graph storage 320 stores the knowledge graph produced in textual passages and relationships 316 and textual summarization 318. For example, the knowledge graph may be generation and/or stored in a JSON format in a relational database. This may provide improved latency and reduced compute, memory, and power requirements as compared to current vector or graph databases. However, in some implementations, a graph database may be utilized.

Knowledge graph generation with summarization 310 may be utilized to generate or update a knowledge graph manually, based on a user request, or automatically, for example based on a schedule or responsive to an indication that a document or other portion of a corpus of textual information has been changed.

Question answer inference 340 provides an answer to a question. It starts with natural language textual sequence 342 where a natural language textual sequence representing a question is received from a user. For example, a user may interact with a web page provided by a server, such a server 110 to a user device such as user device 104 to enter text corresponding to a question which is then transmitted to server 110 and received by natural language textual sequence 342.

Pre-processing 344 may analyze the natural language textual sequence and make modifications, depending on the implementation. For example, pre-processing 344 may include determining whether the question is a compound question and generating two (or more) natural language textual sequences representing the two (or more) in place of the original natural language textual sequence. Other pre-processing steps may be taken, depending on the implementation, such as to evaluate the safety, appropriateness, or domain of the natural language textual sequence.

Knowledge graph retrieval 346 retrieves textual passages and summaries from a stored knowledge graph, for example, a knowledge graph stored by knowledge graph storage 320.

Knowledge graph retrieval 346, for example, may determine what textual passages to retrieve by comparing the natural language textual sequence (or a portion thereof) against textual passages in the knowledge graph and ranking textual passages based on a resulting value. The textual passages having a value over a certain threshold, the top K textual passages, or some combination thereof may be selected for retrieval. In some implementations, the comparison may be performed using a graph neural network (GNN) to produce rankings of textual passages. The comparison may be performed, for example, using a similarity or dissimilarity metric (such as cosine similarity, Euclidean distance, or the like) to compute pairwise similarity or distance between embeddings of textual passages and embedding(s) of the natural language textual sequence. The resulting computed values may be ranked and textual passages selected, for example, by using metrics such as top-K, mean reciprocal rank (MRR), normalized discounted cumulative gain (NDCG), or the like.

Knowledge graph retrieval 346, for example, may retrieve textual passages and/or relationships by comparing the natural language textual sequence (or a portion thereof) against relationships in the knowledge graph and ranking relationships based on a resulting value. For example, a ranking process using the metrics described above may be used. The relationships selected by the ranking process and/or the textual passages related to the selected relationships may be retrieved.

Knowledge graph retrieval 346, for example, may retrieve a textual or document summary from the knowledge graph based on comparisons between the natural language textual sequence (or a portion thereof) and summaries in the knowledge graph. For example, summaries in the knowledge graph may be ranked using a ranking process using the metrics described above. The textual and/or document summaries selected from the ranking process may be retrieved.

Knowledge graph retrieval 346, for example, may retrieve textual and document summaries relating to retrieved textual passages and/or textual summaries, for example, by using a tree stored in the knowledge graph to retrieve summaries corresponding to nodes and a root of the tree that are connected to a leaf of the tree corresponding to a retrieved textual passage.

Depending on the implementation, some or all of the foregoing techniques may be used to retrieve textual passages, relationships, and/or summaries from the knowledge graph. Other approaches to retrieving textual passages, relationships, and/or summaries may also be utilized.

Answer inference 348 provides question related input to a language model to obtain an answer output. For example, the question related input provided to the language model can include or be based on the natural language textual sequence and some or all of the textual passages, textual summaries, document summaries, and/or relationships retrieved from the knowledge graph. The language model uses the input to infer an answer output.

In some implementations, the language model is an encoder-decoder model and is configured to create separate intermediate outputs using encoder layers of the language model based on inputs including text based on the natural language textual sequence and at least a textual passage or a textual summary. For example, text based on the natural language textual sequence, a first textual passage and summaries associated with the first textual passage may be encoded into a first intermediate output, text based on the natural language textual sequence, a second textual passage and summaries associated with the second textual passage may be encoded into a second intermediate output, text based on the natural language textual sequence, a third textual passage (retrieved based on a comparison between text based on the natural language textual sequence and relationships in the knowledge graph) and summaries associated with the third textual passage may be encoded into a third intermediate output, and text based on the natural language textual sequence, a textual summary (retrieved based on a comparison between the textual summary and text based on the natural language textual sequence) and summaries associated with the textual summary may be encoded into a fourth intermediate output. Depending on the implementation, the intermediate outputs may be re-ranked (e.g., using metrics such as described previously) and a subset of the intermediate outputs provided to decoder layer(s) of the language model to infer an answer output.

Inference output 350 provides output to a user based on the answer output by the language model. For example, the output provided to the user may be the text output by the language model or modifications thereof. Modifications may be made, for example, by post-processing steps performed on the answer, for example, that check and/or correct for accuracy, safety, and/or tone of the answer. The output may be provided to the user, for example, by way of transmitting the output to user device 104.

Depending on the implementation, variations of question answer platform 300 are possible. For example, question answer platform 300 may only include one of knowledge graph generation with summarization 310 and question answer inference 340. For example, if only question answer inference 340 is implemented, a knowledge graph compatible with question answer inference 340 may be input (e.g., the knowledge graph is generated elsewhere). For example, if only knowledge graph generation with summarization 310 is implemented, the resulting knowledge graph may be stored for later use elsewhere.

Depending on the implementation, components of question answer platform 300 may be different from what is shown and described, modified from what is shown or described, combined, split apart, or combinations thereof. For example, in some implementations, pre-processing 314 or pre-processing 344 may be omitted. For example, in some implementations, textual passages and relationship 316 and textual summarization 318 may be combined in a single component that generates a knowledge graph. For example, in some implementations, a post-processing step may be added between answer inference 348 and inference output 350. Other variations of question answer platform 300 are possible.

Depending on the implementation, question answer platform 300 may include inferring a textual output from a natural-language input in addition to or instead of providing an answer to a question. In some implementations, question answer platform 300 may instead be referred to as a natural language generation platform or a semantic structuring platform.

To further illustrate the operation of implementations of question answer platform 300, reference is now made to FIGS. 4-8 which illustrate certain concepts relating to the operation of question answer platform 300 in accordance with certain implementations of this disclosure.

FIG. 4 illustrates a document, textual passages, and a relationship according to implementations of this disclosure. FIG. 4 includes a document 400, textual passage 410, textual passage 420, and relationship 430. For example, document 400 may be a document in the corpus of textual information received using textual information 312. Document 400 may be chunked or otherwise modified by pre-processing 314. Document 400 (as or if modified) is used by textual passages and relationships 316 to obtain textual passages, such as textual passage 410 and textual passage 420 and relationships such as relationship 430. In the example of FIG. 4, relationship 430 is between textual passage 410 and textual passage 420.

FIG. 4 is provided as an example only and additional or different textual passages and relationships may be obtained from document 400, depending on the implementation. Depending on the implementation, textual passages and/or relationships may include text exactly as found in the underlying document or textual information or may include variations on the text found in the underlying document or textual information.

tures for representing text passages and relationships are possible. Follows is an example of a different representation of text passages and relationships for a knowledge graph relating to holiday and PTO policy information:

```
nodes = [
"Holidays",
"New Year's Day", "Presidents' Day", "Memorial Day", "Independence Day",
"Labor Day", "Thanksgiving Day", "Day After Thanksgiving", "Christmas Eve
Day",
"Christmas Day", "New Year's Eve Day",
"Leaves of Absence",
"Paid Time Off (PTO)",
"Employees",
"Full-Time Employees", "Part-Time Employees", "Temporary Employees",
"PTO Accrual",
"PTO Request and Approval Process",
"Payroll",
"CEO of Qordoba",
"Doc ID: f4e479cfe3c54506f1589f40577fbd7a8570a507"
]
edges = [
("Holidays", "New Year's Day", {"relationship": "includes"}),
("Holidays", "Presidents' Day", {"relationship": "includes"}),
("Holidays", "Memorial Day", {"relationship": "includes"}),
("Holidays", "Independence Day", {"relationship": "includes"}),
("Holidays", "Labor Day", {"relationship": "includes"}),
("Holidays", "Thanksgiving Day", {"relationship": "includes"}),
("Holidays", "Day After Thanksgiving", {"relationship": "includes"}),
("Holidays", "Christmas Eve Day", {"relationship": "includes"}),
("Holidays", "Christmas Day", {"relationship": "includes"}),
("Holidays", "New Year's Eve Day", {"relationship": "includes"}),
("Leaves of Absence", "Paid Time Off (PTO)", {"relationship": "includes"}),
("Paid Time Off (PTO)", "Employees", {"relationship": "applies to"}),
("Employees", "Full-Time Employees", {"relationship": "category"}),
("Employees", "Part-Time Employees", {"relationship": "category"}),
("Employees", "Temporary Employees", {"relationship": "category"}),
("Paid Time Off (PTO)", "PTO Accrual", {"relationship": "has aspect"}),
("Paid Time Off (PTO)", "PTO Request and Approval Process", {"relationship":
"has process"}),
("PTO Request and Approval Process", "Payroll", {"relationship":
"involves"}),
("PTO Request and Approval Process", "CEO of Qordoba", {"relationship":
"involves"}),
("Holidays", "Doc ID: f4e479cfe3c54506f1589f40577fbd7a8570a507",
{"relationship": "documented in"}),
("Leaves of Absence", "Doc ID: f4e479cfe3c54506f1589f40577fbd7a8570a507",
{"relationship": "documented in"})
]
```

For example, in an implementation, the following JSON output representing textual passages and relationships may be obtained from document 400:

```
[["Earth", "rotates", "Coordinated Universal Time (UTC)"], ["Earth",
"rotation rate", "days and nights"], ["Earth", "rotation", "negative
leap second"], ["Earth", "rotation rate", "ice melt"], ["Earth",
"rotation", "climate change"], ["Ice sheets", "losing mass", "Earth"],
["Negative leap second", "effect", "computer systems"], ["Negative leap
second", "challenge", "global timing infrastructure"], ["Duncan Agnew",
"author", "study"], ["Duncan Agnew", "researcher", "University of
California, San Diego"], ["Earth's rotation acceleration", "Ice
sheets", "losing mass"], ["Ice sheet mass loss", "affects", "Earth's
rotation rate"], ["Ice sheet mass loss", "slowed", "Earth's rotation
acceleration"], ["Negative leap second", "not needed", "until 2029"],
["Duncan Agnew", "author of", "study"], ["Duncan Agnew", "told",
"NBC News"], ["Study", "finds", "ice melt"], ["Ice melt", "caused", "by
climate change"], ["Negative leap second", "not used before"],
["Negative leap second", "poses problem", "for computer systems"],
["Negative leap second", "poses problem", "for global timing
infrastructure"], ["University of California, San Diego", "location
of", "Duncan Agnew"]]
```

In the foregoing example, the information is structured in tuples of first text passage, relationship, and second text passage. This structure is an example only and other struc- FIG. 5 is an illustration of a knowledge graph 500 according to implementations of this disclosure. FIG. 5 includes nodes 510, 512, 514, 516, 530, and 532 and relationships 520, 522, 524, and 534. Nodes 510 and 512 respectively correspond to textual passages 410 and 420 and relationship 520 corresponds to relationship 430. The remaining nodes and relationships of FIG. 5 correspond to textual passages, textual summaries, and or relationships not otherwise depicted in FIG. 4. The relationships in knowledge graph 500 include those that are directional and not directional. For example, relationship 520 indicates a direction pointing from node 512 to node 510 because Duncan Agnew is a researcher at University of California San Diego. Depending on the implementation, relationships in a knowledge graph may or may not include directionality.

A knowledge graph may also include tree(s) of textual summaries such as described later with respect to FIG. 8.

FIG. 6 is an illustration of a document, textual passage, and summaries according to implementations of this disclosure. FIG. 6 includes document 600, textual passage 610, textual information 620, textual information 622, textual summary 630, textual summary 632, and document summary 640. Textual information 620 includes text in a first vicinity of textual passage 610 for which a textual summary 630 may be generated. Textual information 622 includes text in a second vicinity of textual passage 610 for which a textual summary 632 may be generated. The second vicinity as shown includes more text than the first vicinity and includes the text of the first vicinity. Accordingly, textual summary 632 provides a summary at a higher level or "compression" than the textual summary 630 which corresponds to less text, provided that textual summary 630 and textual summary 632 have a similar length. Document summary 640 may be generated from the text in document 600.

The summaries shown in FIG. 6 may be generated by a language model, for example, by providing the corresponding text from textual information 620, 622 or document 600 to the language model to obtain summarized output having a shorter number of words/characters than the input. In some implementations, the generated summary may be limited to a certain number of tokens, characters, or words. In some implementations, the language model may be provided as input one or more previously generated summaries to reduce overlap in information included in generated summaries.

Figure 7:
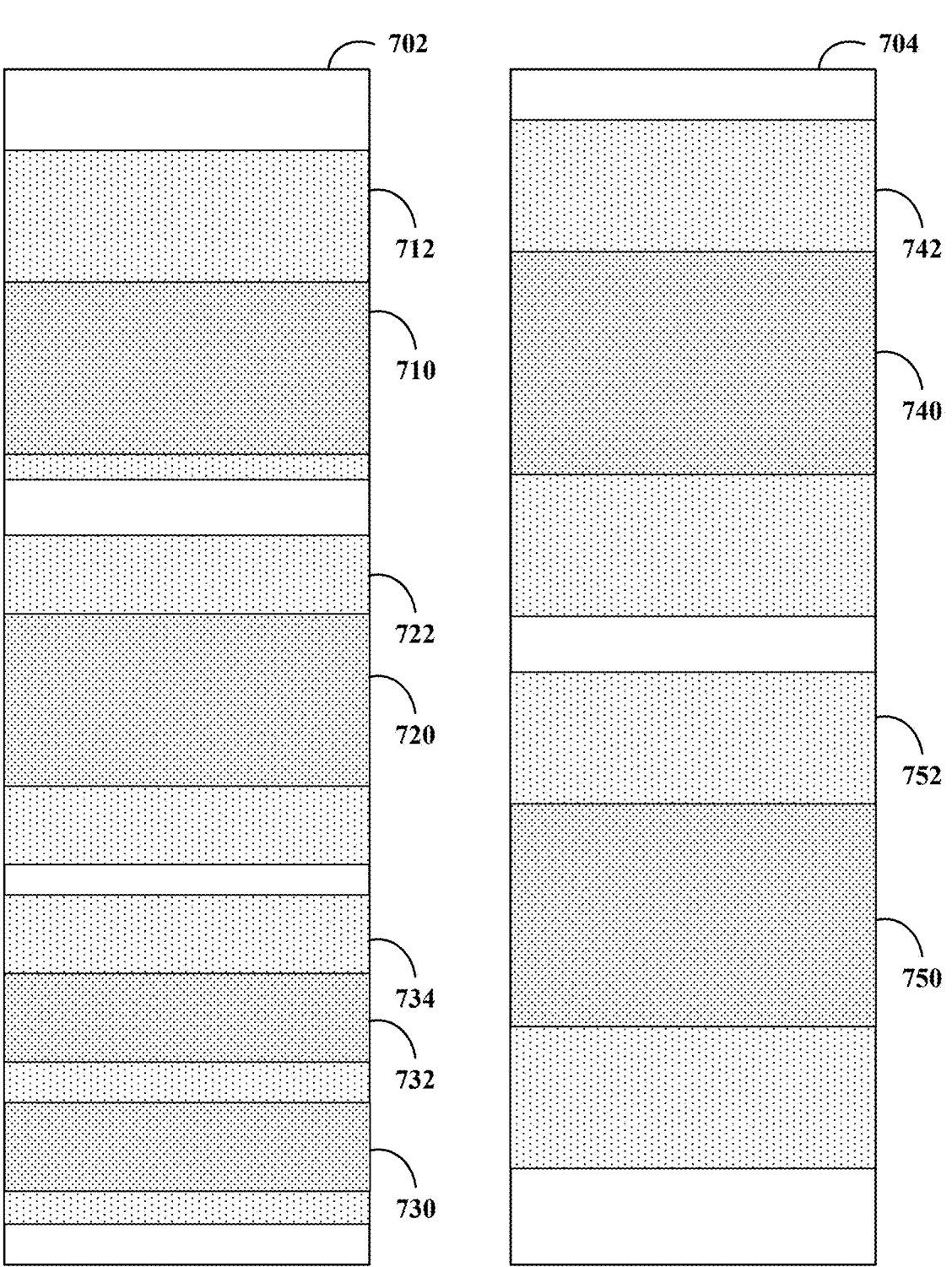
FIG. 7 is an illustration of documents and textual summaries according to implementations of this disclosure.

FIG. 7 is an illustration of documents and textual summaries according to implementations of this disclosure. FIG. 7 includes document 702, document 704, and textual information 710, 712, 720, 722, 730, 732, 734, 740, 742, 750, and 752. Textual summaries may be generated for some or all of textual information 710, 712, 720, 722, 730, 732, 734, 740, 742, 750, and 752. As shown, a given document (e.g., document 702 or document 704) may have multiple hierarchies of summaries generated for text within such document. For example, with respect to document 702, a first level of summaries may be generated respectively for textual information 710, 720, 730 and 732 a second level of summaries may be generated respectively for textual information 712, 722, and 734, and a third level summary (e.g., a document summary) may be generated for document 702. For example, with respect to document 704, a first level of summaries may be generated respectively for textual information 740, 750, a second level of summaries for textual information 742, 752, and a third level summary for document 704.

As shown in FIG. 7, the relationship between textual information at different levels may vary. For example, a vicinity of textual information 712 includes more text before than after textual information 710, whereas a vicinity of textual information 722 includes a similar amount of text before and after textual information 720. For example, textual information 734 encompasses multiple textual information 730, 732 corresponding to multiple textual summaries whereas other illustrated second level textual information includes only one lower level textual information and corresponding summary.

As shown in FIG. 7, a given document can include multiple areas of textual information and corresponding summaries at multiple levels however, the number and configuration of textual information and summaries may vary depending on the implementation. For example, there may be additional or fewer levels of textual information and corresponding summaries and/or the number of levels of textual information or summaries may vary in a document or for different documents. For example, there may be a greater number or fewer number of textual information at a given level within the vicinity of textual information at a higher level. Other variations in textual information and corresponding summaries are possible depending on the implementation.

Figure 8:
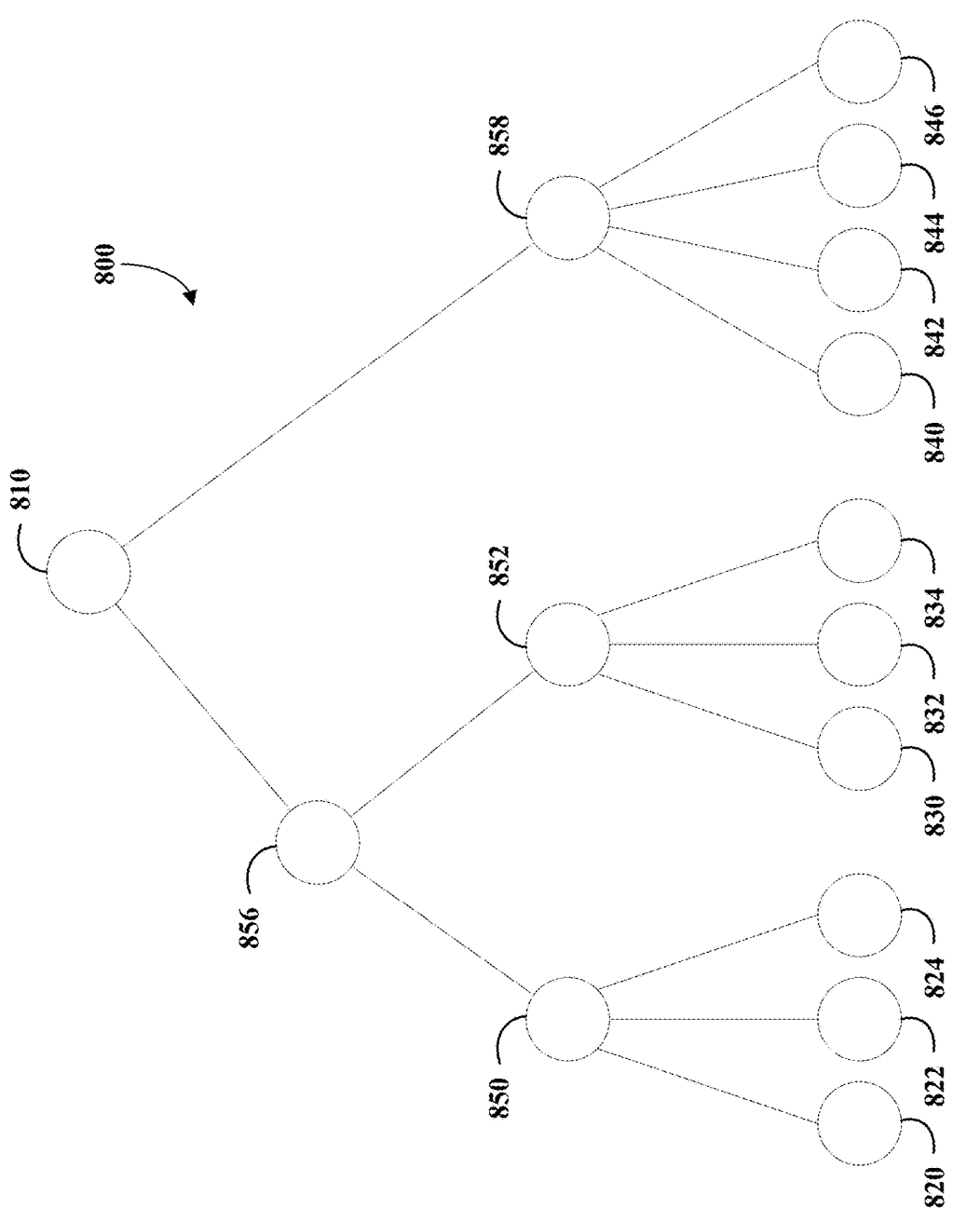
FIG. 8 is an illustration of a tree in a knowledge graph according to implementations of this disclosure.

FIG. 8 is an illustration of a tree 800 in a knowledge graph according to implementations of this disclosure. For example, in some implementations, a knowledge graph produced by knowledge graph generation with summarization 310 may include one or more trees like tree 800 and nodes and relationships corresponding to textual passages and relationships such as shown in FIG. 5. For example, in some implementations, the leaves of the trees included in the knowledge graph may correspond to textual passages and relationships may be represented as edges between the leaves.

Tree 800 includes a root node 810, leaves 820, 822, 824, 830, 832, 834, 840, 842, 844, 846, and nodes 850, 852, 856, and 858. As shown, node 850 corresponds to leaves 820, 822, 824, node 852 corresponds to leaves 830, 832, 834, and node 858 corresponds to leaves 840, 842, 844, 846. Node 856 corresponds to nodes 850 and 852 and root node corresponds to nodes 856 and 858. For example, nodes 850, 852, and 858 may correspond to a first level of summarization, node 856 may correspond to a second level of summarization and root node 810 may correspond to a third level of summarization. Depending on the implementation the number of levels or nodes corresponding to nodes or leaves may vary. For example, as shown, the number of levels with respect to a particular leaf may vary (e.g., leaf 820 has three corresponding summaries and leaf 840 has two corresponding summaries). In some implementations, each leaf may have the same corresponding number of summaries.

Figure 9:
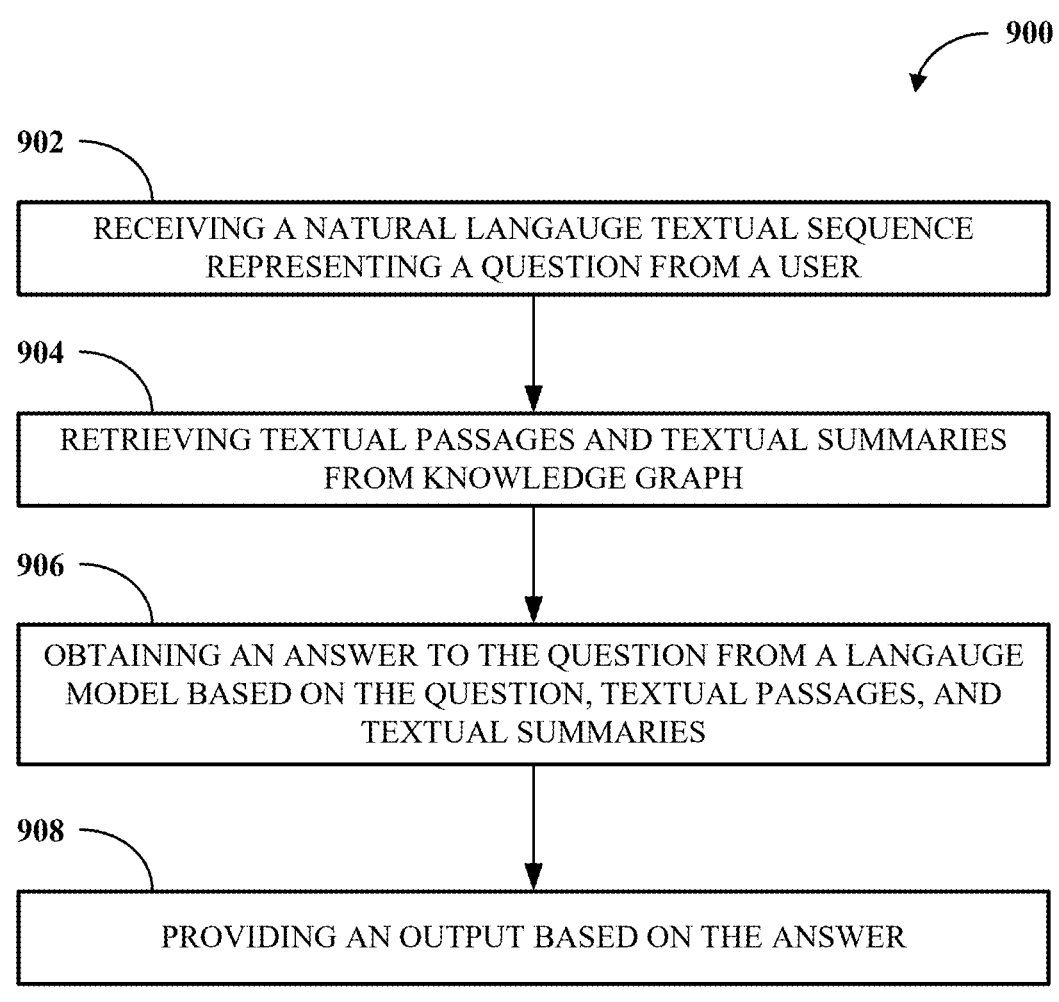
FIG. 9 is a flowchart of an example of a technique for producing an answer to a question relating to a domain in accordance with implementations of this disclosure.

FIG. 9 is a flowchart of an example of a technique 900 for producing an answer to a question relating to a domain in accordance with implementations of this disclosure. The steps of FIG. 9 may be performed in a question answer system, such a question answer system 100 using one or more computing devices such as computing device 200. For example, steps of FIG. 9 may be performed by components of question answer inference 340 of a question answer platform 300 as depicted and described with respect to FIG. 3. In some implementations, technique 900 operates consistent with the illustrations of at least one of FIGS. 4-8.

In step 902, technique 900 includes receiving a natural language textual sequence representing a question from a user. For example, a user may enter text corresponding to a question into a user device, such as user device 104 and may be transmitted to a server, such as server 110 and may then be received by a question answering system or platform, such as by natural language textual sequence 342. For example, step 902 may be performed by natural language textual sequence 342 of question answer inference 340 or using techniques referenced with respect to natural language textual sequence 342.

In step 904, technique 900 includes retrieving textual passages and textual summaries from a knowledge graph. The knowledge graph can be associated with a domain (e.g., information associated with a particular company or industry, or other area of information). The knowledge graph may for example be a graph like the graph described above with respect to FIGS. 5 and 8. For example, step 904 may be performed by knowledge graph retrieval 346 of question answer inference 340 or using techniques referenced with respect to knowledge graph retrieval 346.

In at least a first implementation, a first textual passage based on a first ranking with respect to the natural language textual sequence, a first textual summary associated with the textual passage, a second textual passage based on a first ranking with respect to a comparison of the second textual passage and the natural language textual sequence, a second textual summary associated with the second textual passage, and a third textual summary based on a second ranking with respect to the natural language textual sequence are retrieved. In some implementations, the first textual passage is from a first document and the first textual summary is a summary of a portion of the first document. In some implementations, a first document summary that is a summary of the entire first document is retrieved. In some implementations, the knowledge graph includes a tree corresponding to a first document, the root of the tree corresponding to a summary of the first document, nodes of the tree corresponding to textual summaries of portions of the first document, and leaves of the tree corresponding to textual passages of the first document. In some implementations, the first textual summary corresponds to a node immediately above a leaf corresponding to the first textual passage.

In at least a second implementation, a first textual passage and a second textual passage are retrieved based on rankings with respect to the natural language textual sequence, a first textual summary summarizing textual information in a first vicinity of the first textual passage is retrieved, and a second textual summary summarizing textual information in a vicinity of the second textual passage is retrieved. In some implementations, a third textual passage is retrieved based on a first ranking with respect to a relationship of the third textual passage and the natural language textual sequence and a third textual summary summarizing textual information in a vicinity of the third textual passage is retrieved. In some implementations, a fourth textual summary is retrieved based on a second ranking with respect to the fourth textual summary and the natural language textual sequence. In some implementations, the knowledge graph includes a tree corresponding to a first document of textual information, the root of the tree corresponding to a summary of the first document, nodes of the tree corresponding to textual summaries of portions of the first document, and leaves of the tree corresponding to textual passages of the first document. The first textual passage corresponds to a first leaf of the tree and the first textual summary corresponds to a first node of the tree connected to the first leaf. In such implementations, the summary of the first document corresponding to the root of the tree and a fifth textual summary summarizing textual information in a second vicinity of the first textual passage may also be retrieved.

In some implementations, the knowledge graph does not utilize a pre-defined ontology and is stored in a relational database using a JavaScript Object Notation format.

In step 906, technique 900 includes obtaining an answer to the question from a language model based on the question, textual passages, and textual summaries. For example, step 906 may be performed by answer inference 348 of question answer inference 340 or using techniques referenced with respect to answer inference 348. For example, input based on the natural language textual sequence and textual passages and summaries retrieved from the knowledge graph may be provided to a language model from which text representing an answer may be obtained.

In at least with respect to the first implementation described with respect to step 904, the technique includes obtaining an answer to the question from a language model by providing input to the language model based on the natural language textual sequence, the first textual passage, the first textual summary, the second textual passage, the second textual summary, and the third textual summary. In some implementations, the language model is an encoder-decoder model that separately encodes at least the first textual passage, the second textual passage, and the third textual summary into respective intermediate outputs. In some implementations, the language model re-ranks the intermediate outputs and concatenates a subset of the intermediate outputs for processing by a decoder of the language model to obtain the answer. In some implementations, the subset of the intermediate outputs includes an encoding based on the natural language textual sequence, the first textual passage, and the first textual summary. In some implementations, the language model encodes the first textual passage jointly with the first textual summary into an output that is concatenated with at least one other encoding for joint decoding.

In at least with respect to the second implementation described with respect to step 904, the technique includes obtaining an answer to the question using a language model by encoding a first intermediate output based on the natural language textual sequence, the first textual passage, and the first summary, encoding a second intermediate output based on the natural language textual sequence, the second textual passage, and the second summary, and decoding a concatenation of the first intermediate output and the second intermediate output. In some implementations, the language model includes encoding a third intermediate output based on the natural language textual sequence, the third textual passage, and the third summary. In some implementations, the language model includes encoding a fourth intermediate output based on the natural language textual sequence and the fourth summary. In some implementations, the concatenation includes at least one of the third intermediate output and the fourth intermediate output.

In step 908, technique 900 includes providing an output based on the answer. For example, step 906 may be performed by inference output 350 of question answer inference 340 or using techniques referenced with respect to inference output 350. For example, answer text may be transmitted from a server such as server 110 to a user device such as user device 104 for display to a user. In at least some implementations, the answer may be post-processed such that the answer provided to the user differs from the text obtained from the language model.

Variations of technique 900 including those that modify, add, or remove steps are possible. For example, in some implementations, an additional pre-processing step may modify the natural language text sequence before it is input to the language model, such as described above with respect to pre-processing 344.

In some implementations of technique 900, a textual input is used instead of a question and a textual output is produced instead of an answer. In some implementations of technique 900, the steps of FIG. 9 may be performed in a natural language generation system or a semantic structuring system, such as described above with respect to FIG. 1 or 3.

FIG. 10 is a flowchart of an example of a technique 1000 for generating a knowledge graph including textual passages and textual summaries usable for producing an answer to a question relating to a domain in accordance with implementations of this disclosure. In some implementations, the generated knowledge graph may be used to produce a textual output in response to a textual input. The steps of FIG. 10 may be performed in a question answer system, such a question answer system 100 using one or more computing devices such as computing device 200. For example, steps of FIG. 10 may be performed by components of knowledge graph generation with summarization 310 of a question answer platform 300 as depicted and described with respect to FIG. 3. In some implementations, technique 1000 operates consistent with the illustrations of at least one of FIGS. 4-8.

In step 1002, technique 1000 includes receiving a corpus of textual information. For example, textual information may be transmitted from data sources, such as data source 106 to a server such as server 110 and may then be received by a question answering system or platform, such as by textual information 312. For example, step 1002 may be performed by textual information 312 of knowledge graph generation with summarization 310 or using techniques referenced with respect to textual information 312.

In step 1004, technique 1000 includes obtaining textual passages and descriptions of associations between textual passages by providing at least a portion of the corpus of textual information to a language model. For example, step 1004 may be performed by textual passages and relationships 316 of knowledge graph generation with summarization 310 or using techniques referenced with respect to textual passages and relationships 316.

In some implementations, the language model is a first language model and is a decoder-only model. In some implementations, the first language model is pre-trained to produce an output of textual passages and descriptions of associations between textual passages based on an input to the first language model without reference to a pre-determined ontology. In some implementations, the output of textual passages and associations between textual passages is formatted in a JavaScript Object Notation format.

In step 1006, technique 1000 includes obtaining textual summaries corresponding to textual passages from a language model. For example, step 1006 may be performed by textual summarization 318 of knowledge graph generation with summarization 310 or using techniques referenced with respect to textual summarization 318.

In step 1008, technique 1000 includes generating a knowledge graph based on the textual passages, descriptions of associations between textual passages, and textual summaries. For example, step 1008 may be performed by textual passages and relationships 316 and/or textual summarization 318 of knowledge graph generation with summarization 310 or using techniques referenced with respect to textual passages and relationships 316 and/or textual summarization 318, or FIG. 5 or 8.

In some implementations, the generated knowledge graph includes a tree corresponding to a first document of the textual information, the root of the tree corresponding to a summary of the first document, nodes of the tree corresponding to textual summaries of portions of the first document, and leaves of the tree corresponding to textual passages of the first document.

In step 1010, technique 1000 includes storing the knowledge graph in a relational database on a non-transitory computer readable medium. For example, step 1010 may be performed by knowledge graph storage 320 of knowledge graph generation with summarization 310 or using techniques referenced with respect to knowledge graph storage 320.

In some implementations, the stored knowledge graph is stored in a JavaScript Object Notation format.

Variations of technique 1000 including those that modify, add, or remove steps are possible. For example, in some implementations, an additional pre-processing step may modify the corpus of textual information before it is input to the language model, such as described above with respect to pre-processing 314. For example, in some implementations, technique 1000 includes pre-processing the portion of the corpus of textual information using a context-aware splitting model to produce output of a size less than a context window of the first language model. For example, in some implementations, the knowledge graph is not stored in a relational database and is stored in a different type of database, such as a graph database.

The technique 900 and/or the technique 1000 can be executed using computing devices, such as the systems, hardware, and software described with respect to FIGS. 1-8. The technique 900 and/or the technique 1000 can be performed, for example, by executing a machine-readable program or other computer-executable instructions, such as routines, instructions, programs, or other code. The steps, or operations, of the technique 900 and/or the technique 1000 or another technique, method, process, or algorithm described in connection with the implementations disclosed herein can be implemented directly in hardware, firmware, software executed by hardware, circuitry, or a combination thereof.

Figure 11:
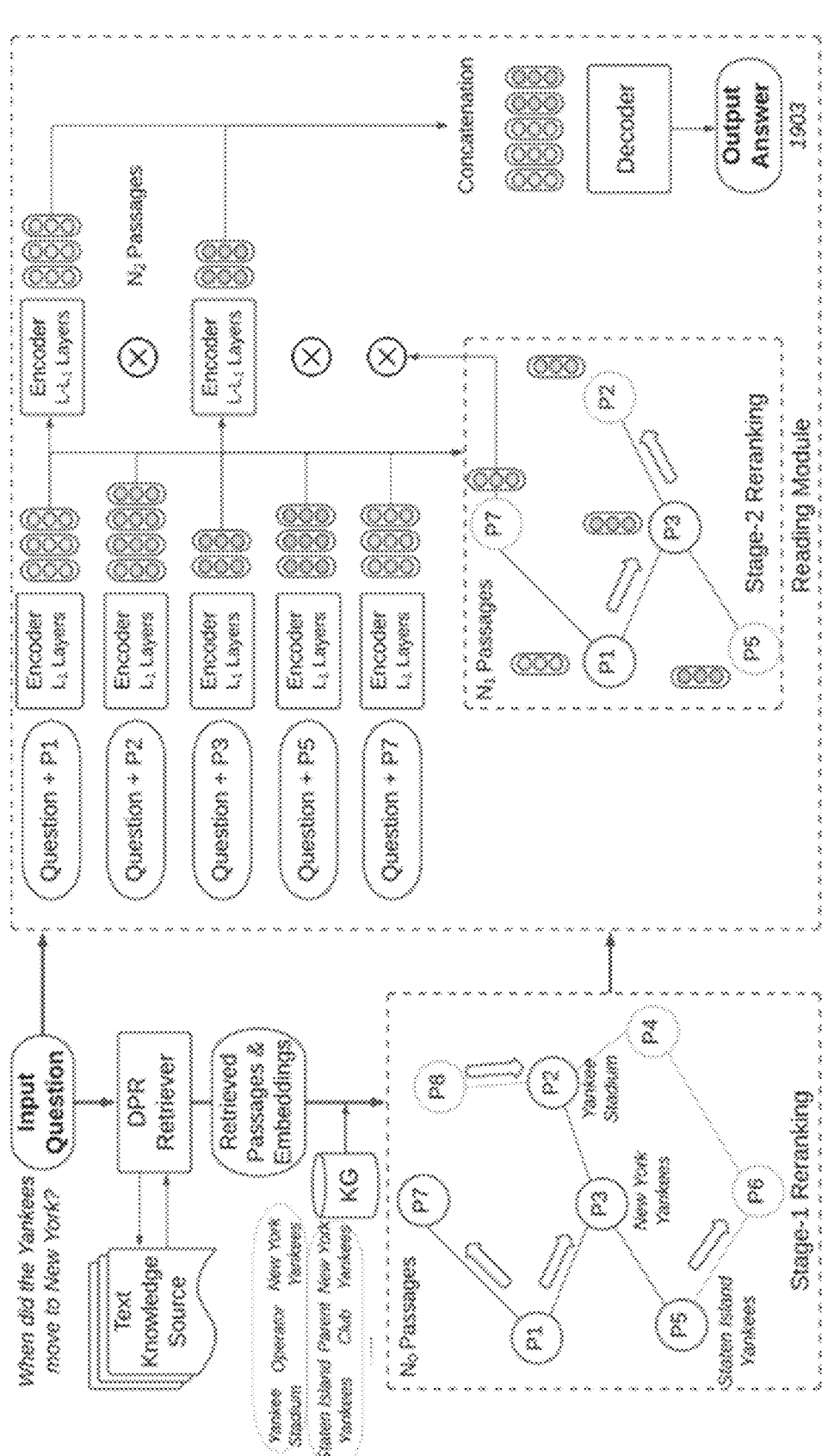
FIG. 11 is an illustration of question answer technique in accordance with implementations of this disclosure.

FIG. 11 is an illustration of question answer technique in accordance with implementations of this disclosure. FIG. 11 illustrates a question answer technique starting with an input question (e.g., a natural language textual sequence) that is used to rank and retrieve textual passages from a knowledge graph. Highly ranked textual passages are combined with the input question for encoding into intermediate outputs. The intermediate outputs are re-ranked and a subset of the intermediate outputs are concatenated for processing by a decoder to obtain an output answer.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, Python, Ruby, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to hardware, mechanical or physical implementations, but can include software routines implemented in conjunction with hardware processors, etc. Likewise, the terms "system" or "tool" as used herein and in the figures, but in any event based on their context, may be understood as corresponding to a functional unit implemented using software, hardware (e.g., an integrated circuit, such as an application specific integrated circuit (ASIC)), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media and can include volatile memory or non-volatile memory that can change over time. The quality of memory or media being non-transitory refers to such memory or media storing data for some period or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A computer-implemented method for producing an answer to a question relating to a domain, the method comprising:

receiving, by a computing device, a natural-language textual sequence representing the question;

retrieving, by the computing device, from a knowledge graph associated with the domain, a first textual passage and a second textual passage based on rankings with respect to the natural-language textual sequence, a first textual summary summarizing textual information in a first vicinity of the first textual passage, and a second textual summary summarizing textual information in a second vicinity of the second textual passage, wherein the knowledge graph includes a tree corresponding to a document of the textual information, a root of the tree corresponding to a summary of the document, nodes of the tree corresponding to textual summaries of portions of the document, and leaves of the tree corresponding to the textual passages of the document, and wherein the knowledge graph is generated using:

at least a portion of textual information including a plurality of documents relevant to the domain provided to a language model, the textual information is modified into smaller-sized portions using a semantic chunking algorithm to produce modified textual information of a size less than a context window of the language model based on a determination that the textual information exceeds the context window of the language model, the context window corresponds to a limited input size of the language model, the smaller-sized portions of the textual information are tokens, the tokens are converted into high dimensional input sequence of vectors where an input sequence of vector numerically represents the tokens, the language model includes one or more layers of encoders and decoders to process the high dimensional input sequence of vectors to generate an output sequence, the output sequence is used to determine probabilities of successive output tokens which are used to determine an output of the language model, and the language model trained to produce the output of textual passages, descriptions of associations between the textual passages, and textual summaries corresponding to the textual passages using the modified textual information;

obtaining, by the computing device, the answer to the question using the language model by encoding a first intermediate output based on the natural-language textual sequence, the first textual passage, and the first textual summary, encoding a second intermediate output based on the natural-language textual sequence, the second textual passage, and the second textual summary, and decoding a concatenation of the first intermediate output and the second intermediate output; and providing, by the computing device, the output to a user on a user interface, based on the answer.

2. The method of claim 1, wherein retrieving further includes retrieving, from the knowledge graph associated with the domain a third textual passage based on a first ranking with respect to a relationship of the third textual passage and the natural-language textual sequence and a third textual summary summarizing the textual information in a third vicinity of the third textual passage.

3. The method of claim 2, wherein obtaining the answer to the question using the language model further includes encoding a third intermediate output based on the natural-language textual sequence, the third textual passage, and the third textual summary.

4. The method of claim 3, wherein retrieving further includes retrieving, from the knowledge graph associated with the domain a fourth textual summary based on a second ranking with respect to the fourth textual summary and the natural-language textual sequence, wherein obtaining the answer to the question using the language model further includes encoding a fourth intermediate output based on the natural-language textual sequence and the fourth textual summary.

5. The method of claim 4, wherein the concatenation includes at least one of the third intermediate output and the fourth intermediate output.

6. The method of claim 5, wherein the first textual passage corresponds to a first leaf of the tree and the first textual summary corresponds to a first node of the tree connected to the first leaf, wherein retrieving further includes retrieving, from the knowledge graph associated with the domain, the summary of the document corresponding to the root of the tree and a fifth textual summary summarizing the textual information in a fourth vicinity of the first textual passage, wherein encoding the first intermediate output is further based on the summary of the document and the fifth textual summary, wherein the first vicinity includes a first set of textual information and the fourth vicinity includes the first set of textual information and a second set of textual information.

7. A non-transitory computer readable medium including instructions that, when executed by one or more processors, cause the one or more processors to perform a set of actions for producing an answer to a question relating to a domain, the set of actions including:

receiving a natural-language textual sequence representing the question;

retrieving, from a knowledge graph associated with the domain, a first textual passage and a second textual passage based on rankings with respect to the natural-language textual sequence, a first textual summary summarizing textual information in a first vicinity of the first textual passage, and a second textual summary summarizing textual information in a second vicinity of the second textual passage, wherein the knowledge graph includes a tree corresponding to a document of the textual information, a root of the tree corresponding to a summary of the document, nodes of the tree corresponding to textual summaries of portions of the document, and leaves of the tree corresponding to the textual passages of the document, and wherein the knowledge graph is generated using:

at least a portion of textual information including a plurality of documents relevant to the domain provided to a language model, the textual information is modified into smaller-sized portions using a semantic chunking algorithm to produce modified textual information of a size less than a context window of the language model based on a determination that the textual information exceeds the context window of the language model, the context window corresponds to a limited input size of the language model, the smaller-sized portions of the textual information are tokens, the tokens are converted into high dimensional input sequence of vectors where an input sequence of vector numerically represents the tokens, the language model includes one or more layers of encoders and decoders to process the high dimensional input sequence of vectors to generate an output sequence, the output sequence is used to determine probabilities of successive output tokens which are used to determine an output of the language model, and the language model trained to produce the output of textual passages, descriptions of associations between the textual passages, and textual summaries corresponding to the textual passages using the modified textual information;

obtaining the answer to the question using the language model by encoding a first intermediate output based on the natural-language textual sequence, the first textual passage, and the first textual summary, encoding a second intermediate output based on the natural-language textual sequence, the second textual passage, and the second textual summary, and decoding a concatenation of the first intermediate output and the second intermediate output; and providing the output to a user on a user interface, based on the answer.

8. The non-transitory computer readable medium of claim 7, wherein retrieving further includes retrieving, from the knowledge graph associated with the domain a third textual passage based on a first ranking with respect to a relationship of the third textual passage and the natural-language textual sequence and a third textual summary summarizing the textual information in a third vicinity of the third textual passage.

9. The non-transitory computer readable medium of claim 8, wherein obtaining the answer to the question using the language model further includes encoding a third intermediate output based on the natural-language textual sequence, the third textual passage, and the third textual summary.

10. The non-transitory computer readable medium of claim 9, wherein retrieving further includes retrieving, from the knowledge graph associated with the domain a fourth textual summary based on a second ranking with respect to the fourth textual summary and the natural-language textual sequence, wherein obtaining the answer to the question using the language model further includes encoding a fourth intermediate output based on the natural-language textual sequence and the fourth textual summary.

11. The non-transitory computer readable medium of claim 10, wherein the concatenation includes at least one of the third intermediate output and the fourth intermediate output.

12. The non-transitory computer readable medium of claim 11, wherein the first textual passage corresponds to a first leaf of the tree and the first textual summary corresponds to a first node of the tree connected to the first leaf, wherein retrieving further includes retrieving, from the knowledge graph associated with the domain, the summary of the document corresponding to the root of the tree and a fifth textual summary summarizing the textual information in a fourth vicinity of the first textual passage, wherein encoding the first intermediate output is further based on the summary of the document and the fifth textual summary, wherein the first vicinity includes a first set of textual information and the fourth vicinity includes the first set of textual information and a second set of textual information.

13. A system including at least one processor and at least one computer readable medium including instructions that, when executed by the at least one processor, cause the at least one processor to perform a set of actions for producing an answer to a question relating to a domain, the set of actions including:

receiving a natural-language textual sequence representing the question;

retrieving, from a knowledge graph associated with the domain, a first textual passage and a second textual passage based on rankings with respect to the natural-language textual sequence, a first textual summary summarizing textual information in a first vicinity of the first textual passage, and a second textual summary summarizing textual information in a second vicinity of the second textual passage, wherein the knowledge graph includes a tree corresponding to a document of the textual information, a root of the tree corresponding to a summary of the document, nodes of the tree corresponding to textual summaries of portions of the document, and leaves of the tree corresponding to the textual passages of the document, and wherein the knowledge graph is generated using:

at least a portion of textual information including a plurality of documents relevant to the domain provided to a language model, the textual information is modified into smaller-sized portions using a semantic chunking algorithm to produce modified textual information of a size less than a context window of the language model based on a determination that the textual information exceeds the context window of the language model, the context window corresponds to a limited input size of the language model, the smaller-sized portions of the textual information are tokens, the tokens are converted into high dimensional input sequence of vectors where an input sequence f vector numerically represents the tokens, the language model includes one or more layers of encoders and decoders to process the high dimensional input sequence of vectors to generate an output sequence, the output sequence is used to determine probabilities of successive output tokens which are used to determine an output of the language model, and the language model trained to produce the output of textual passages, descriptions of associations between the textual passages, and textual summaries corresponding to the textual passages using the modified textual information;

obtaining the answer to the question using the language model by encoding a first intermediate output based on the natural-language textual sequence, the first textual passage, and the first textual summary, encoding a second intermediate output based on the natural-language textual sequence, the second textual passage, and the second textual summary, and decoding a concatenation of the first intermediate output and the second intermediate output; and providing the output to a user based on a user interface, the answer.

14. The system of claim 13, wherein retrieving further includes retrieving, from the knowledge graph associated with the domain a third textual passage based on a first ranking with respect to a relationship of the third textual passage and the natural-language textual sequence and a third textual summary summarizing the textual information in a third vicinity of the third textual passage.

15. The system of claim 14, wherein obtaining the answer to the question using the language model further includes encoding a third intermediate output based on the natural-language textual sequence, the third textual passage, and the third textual summary.

16. The system of claim 15, wherein retrieving further includes retrieving, from the knowledge graph associated with the domain a fourth textual summary based on a second ranking with respect to the fourth textual summary and the natural-language textual sequence, wherein obtaining the answer to the question using the language model further includes encoding a fourth intermediate output based on the natural-language textual sequence and the fourth textual summary.

17. The system of claim 16, wherein the concatenation includes at least one of the third intermediate output and the fourth intermediate output.

18. The system of claim 17, wherein the first textual passage corresponds to a first leaf of the tree and the first textual summary corresponds to a first node of the tree connected to the first leaf, wherein retrieving further includes retrieving, from the knowledge graph associated with the domain, the summary of the document corresponding to the root of the tree and a fifth textual summary summarizing the textual information in a fourth vicinity of the first textual passage, wherein encoding the first intermediate output is further based on the summary of the document and the fifth textual summary, wherein the first vicinity includes a first set of textual information and the fourth vicinity includes the first set of textual information and a second set of textual information.

* * * * *